United States Patent [19]
Yamada et al.

[11] Patent Number: 5,979,820
[45] Date of Patent: Nov. 9, 1999

[54] FILM MAGAZINE

[75] Inventors: Junji Yamada; Hiroshi Miyawaki; Toru Yoshikawa; Junichi Yamamoto, all of Wakayama, Japan

[73] Assignee: Noritsu Koki Co., Ltd., Wakayame, Japan

[21] Appl. No.: 09/122,508

[22] Filed: Jul. 24, 1998

[30] Foreign Application Priority Data

| | | | |
|---|---|---|---|
| Jul. 25, 1997 | [JP] | Japan | 9-200022 |
| Nov. 6, 1997 | [JP] | Japan | 9-303845 |
| Jun. 15, 1998 | [JP] | Japan | 10-166667 |

[51] Int. Cl.$^6$ .................................................. B65H 18/14
[52] U.S. Cl. ........................ 242/541.3; 242/348; 242/528; 242/539
[58] Field of Search ................................. 242/348, 348.4, 242/541.3, 528, 539

[56] References Cited

U.S. PATENT DOCUMENTS

| | | | |
|---|---|---|---|
| 3,536,276 | 10/1970 | Bundschuh et al. | 242/332.6 |
| 3,670,989 | 6/1972 | Andrews | 242/332.6 |
| 3,743,212 | 7/1973 | Michaels | 242/348 |
| 3,957,220 | 5/1976 | Beck et al. | 242/528 |
| 4,114,530 | 9/1978 | Miller | 100/87 |
| 4,164,177 | 8/1979 | Canfield | 100/40 |
| 4,184,648 | 1/1980 | Mergell | 242/532 |
| 4,283,023 | 8/1981 | Braun et al. | 242/535.4 |
| 4,754,875 | 7/1988 | Rauffer et al. | 242/348 |
| 4,757,952 | 7/1988 | Balzer | 242/528 |
| 5,425,512 | 6/1995 | Bichot et al. | 242/541.3 |
| 5,855,334 | 1/1999 | Abe et al. | 242/348 |

*Primary Examiner*—Donald P. Walsh
*Assistant Examiner*—Minh-Chau Pham

[57] ABSTRACT

A film magazine includes a take-up mechanism for a take-up mechanism for taking up a film in the form of roll, with the film being releasable therefrom. The magazine further includes a support mechanism for supporting the film roll formed by the take-up mechanism in such a manner as to allow a rotational axis of the formed roll to be adjustable in position in accordance with variation in the outer diameter of the roll resulting from the take-up or unwinding operation of the film.

6 Claims, 23 Drawing Sheets

FIG.8
(a)
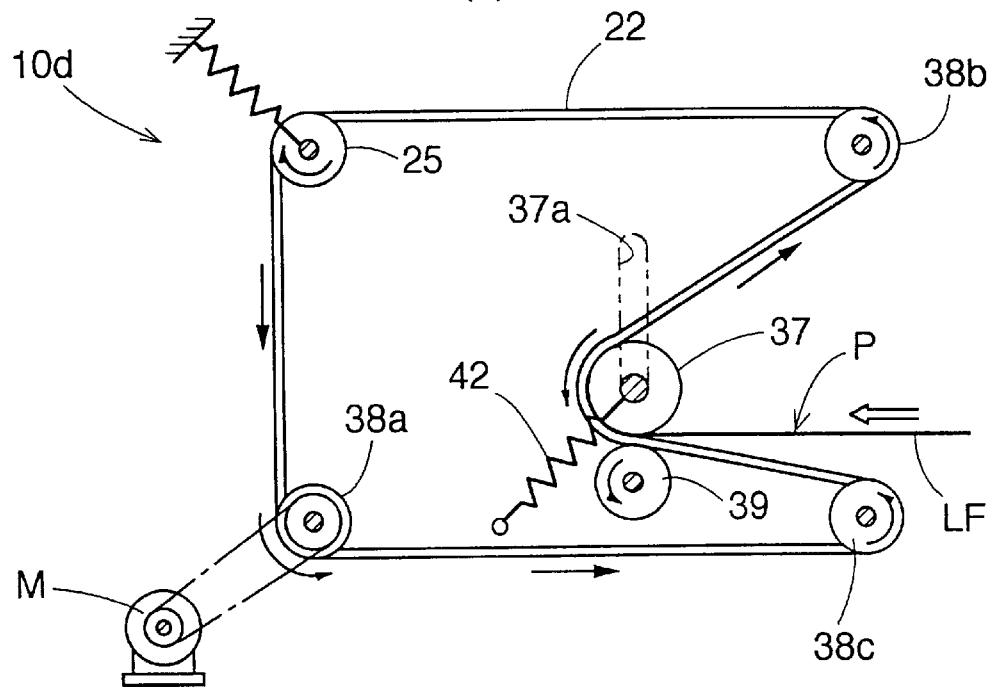
(b)
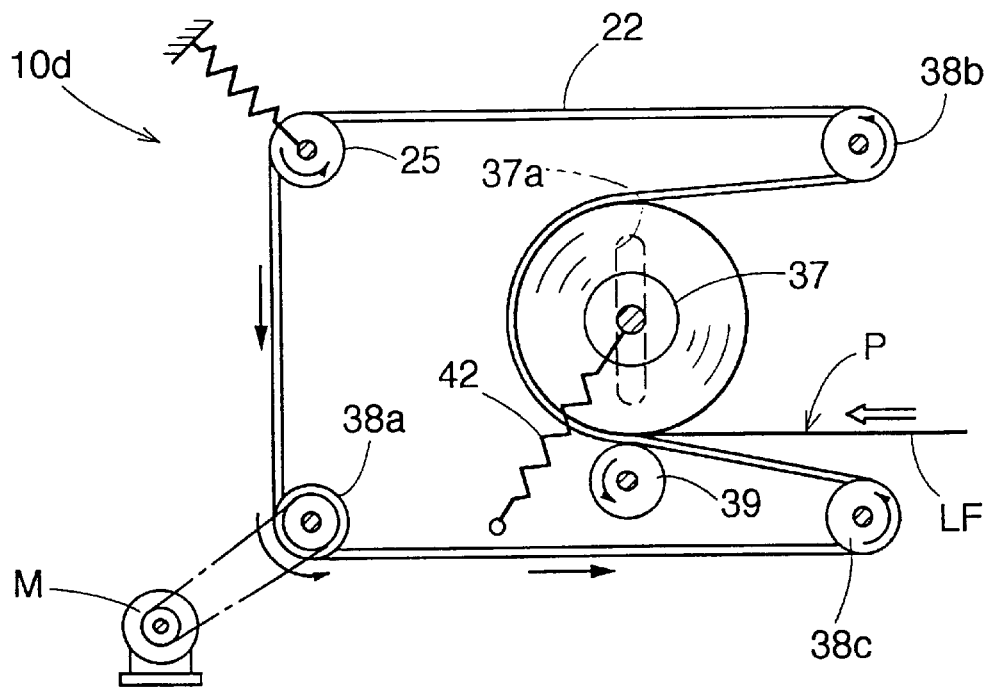

FIG. 21
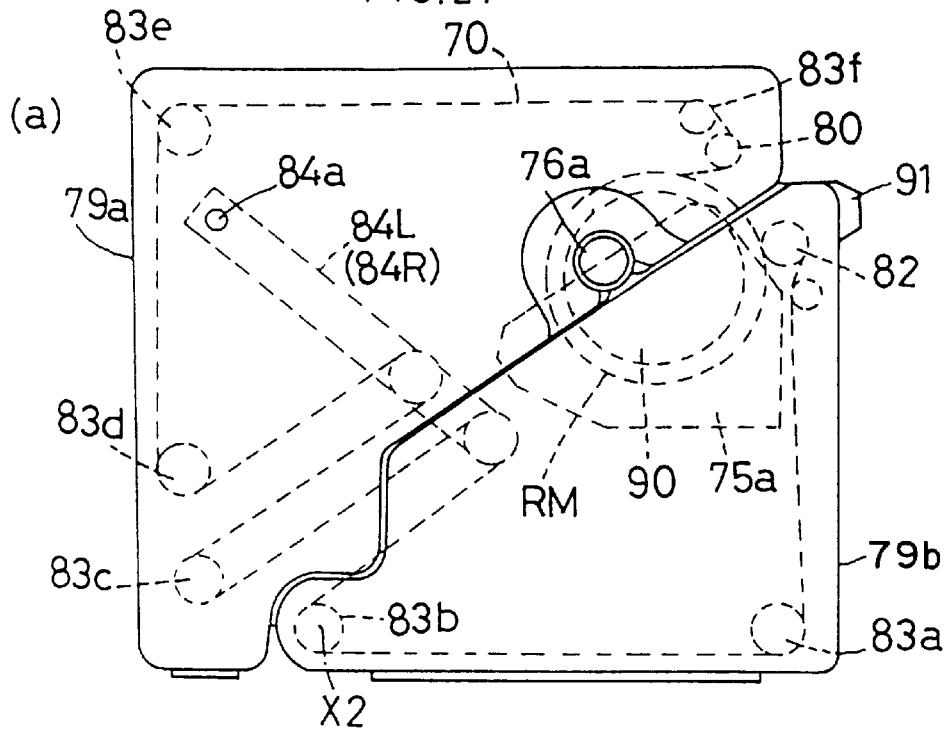
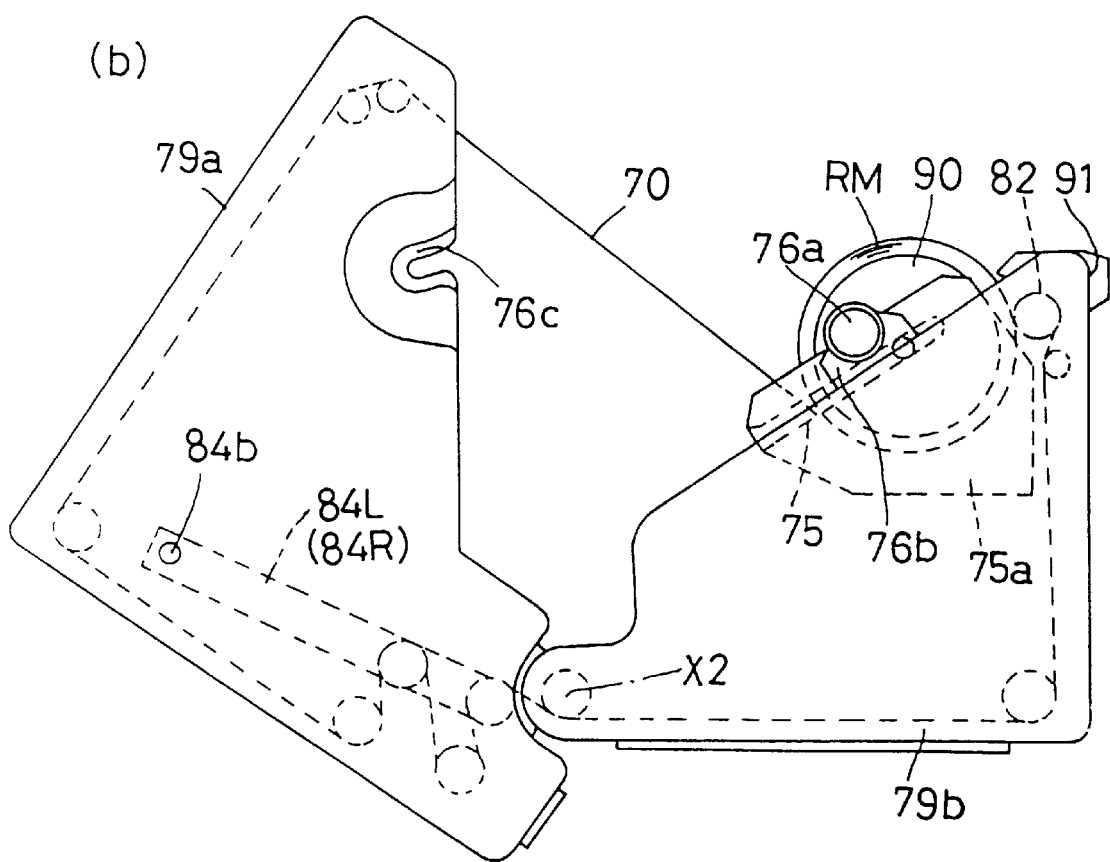

FIG.23
(a)
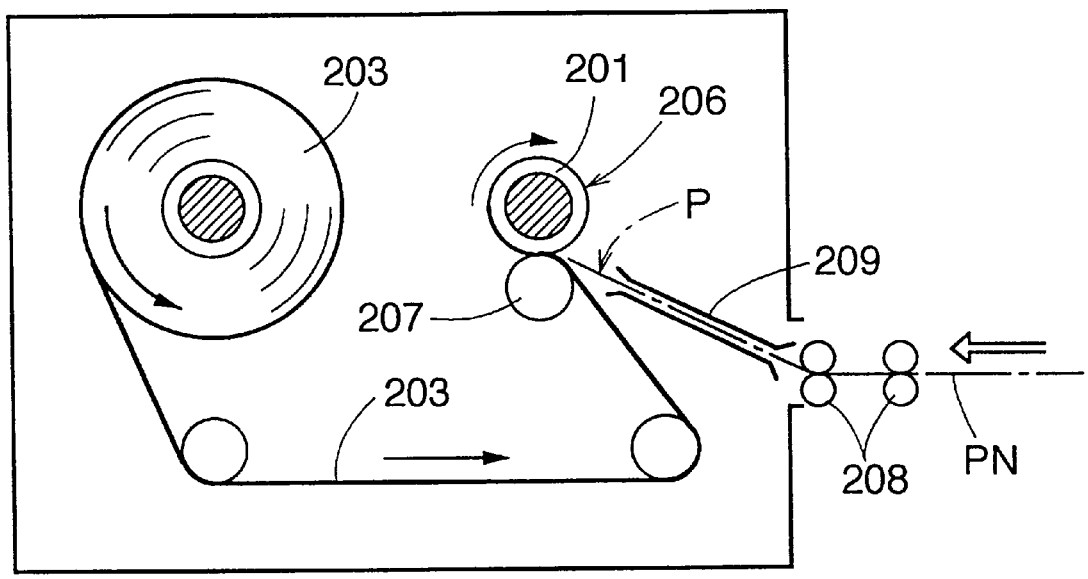
(b)
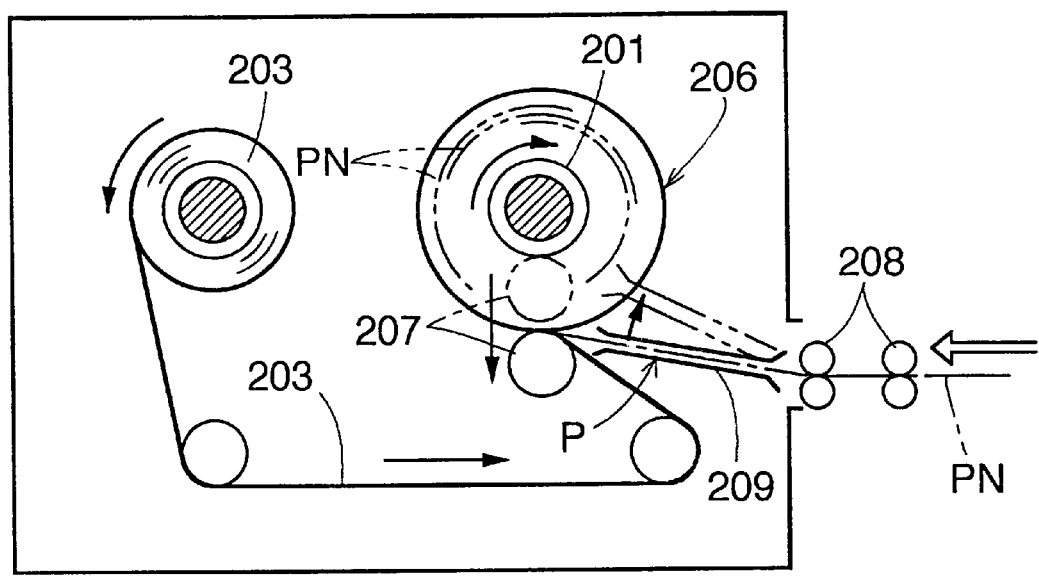

FILM MAGAZINE

BACKGROUND OF THE INVENTION

The present invention relates to a film magazine having a take-up mechanism for taking up a film or a plurality of films into form of a roll and releasing the stored film(s) therefrom.

DESCRIPTION OF THE RELATED ART

JP56-42227 discloses a photographic printing cartridge apparatus, as an example of a film magazine of the above-noted type. With this apparatus, as shown in FIG. 23, a number of negative pieces PN are taken up one after another to be held between adjacent windings of a roll 206 of an elongate storage tape 203 which in turn is taken up in a predetermined direction about a core 201. For releasing thus stored negative pieces PN, the storage tape 203 taken up about the core 201 is unwound therefrom for releasing the negative pieces PN one after another from between the respective adjacent windings thereof to be transported to an exposure section of a photographic processing printer, at which a printing operation of each negative piece onto a print paper is effected.

According to the conventional film cartridge or magazine apparatus described above, the axis of the core 201 for taking up the storage tape 203 together with the negative pieces PN is fixed in position. Hence, as the outer diameter of the roll 206 increases in accordance with increase in the amount or number of the negative pieces taken up, this necessitates change in a transit path P of the negative piece PN. Then, for allowing smooth take-up and release of the negative pieces PN, it is necessary to adjust position of a press roller 207 for pressing the roll 206 from the outside and/or position of a guide member 209 for guiding the negative piece PN between the press roller 207 and a film transport roller 208, in accordance with the change in the transit path P of the negative pieces PN. As a result, the construction of the entire magazine tends to be complicated.

In view of the above, a primary object of the present invention is to provide a film magazine with which variation in the outer diameter of the formed roll according with the number or length of the films to be taken up does not necessitate change in the transit path of the film to the roll.

SUMMARY OF THE INVENTION

For accomplishing the above-noted object, with a film magazine according to the present invention, the rotational axis of the roll formed with the film take-up operation is adjustable in position in accordance with variation in the outer diameter of the roll resulting from the take-up (winding) or unwinding operation of the film.

Hence, with the film magazine proposed by the present invention, by appropriately adjusting the position of the axis of the roll in accordance with variation in the outer diameter thereof resulting from film take-up or unwinding operation, the transit path of the film may remain fixed. Consequently, this construction eliminates the need for position adjustment of e.g. the guide member for guiding the film between the press roller and the transport roller, whereby the construction of the entire apparatus may be simple.

Preferably, the take-up mechanism includes a stationary contact member, a shaft member capable of taking up the film in the form of roll about an outer periphery thereof, means for rotatably driving the shaft member, and means for pressing the roll formed on the shaft member against the contact member.

With the above, the film transit path may be constantly maintained at a position along the stationary contact member, regardless of the variation in the outer diameter of the roll.

Alternatively, the take-up mechanism includes a plurality of cylindrical support members for supporting the roll from the outer peripheral face thereof, and means for rotatably driving the roll via at least one of the cylindrical support members, with an axis of said one cylindrical support member being fixed in position.

With the above, the film transit path may be constantly maintained at a position along the outer periphery of the stationary cylindrical support member having its axis fixed in position. Further, as the rotational force of the driving means is transmitted to the roll via the outer peripheral face thereof, the take-up and unwinding speeds of the film may be maintained always constant, regardless of the variation in the outer diameter of the roll. In addition, in the case of the construction in which the film is taken up about an outer peripheral face of a spool which is driven by an external force, the rotation of the spool may 'squeeze' the film, resulting in peripheral irregularity in the windings of the film due to associated friction between adjacent winding faces of the film. With the above construction proposed by the present invention, however, the film is taken up by rolling the formed film roll by the force applied to the outer peripheral face thereof Thus, such winding irregularity may be effectively restricted.

Further alternatively, the take-up mechanism includes an endless belt for supporting the roll from the outer peripheral face thereof, means for rotatably driving the roll via a rotational drive of the endless belt, and a stationary contact member against which the outer peripheral face of the roll is pressed. With this construction, the transit path of the film may be constantly maintained at a position long the stationary contact member, regardless of the variation in the outer diameter of the roll. Also, since the rotational force of the driving means is transmitted to the roll via the outer peripheral face thereof, the take-up and unwinding speeds of the film may be maintained always constant, regardless of the variation in the outer diameter of the roll. Further, with this construction too, the film is taken up by rolling the formed film roll by the force applied to the outer peripheral face thereof. Thus, the winding irregularity described above may be effectively restricted.

Still alternatively, the take-up mechanism may include a pair of rotary rollers respectively having an axis thereof fixed in position for supporting the roll via an endless belt. With this construction, the roll may always be kept in contact with the pair of rollers via the endless belt. As a result, the transit path of the film may be constantly maintained at a position along one of the pair of rotary rollers.

In the above construction, between the pair of rotary rollers, there may be provided a film entrance/exit for guiding the film on to the roll from the outside or guiding the film from the roll to the outside.

Preferably, at least one of the pair of rotary rollers is provided as a drive roller for driving the endless belt.

Further, the required length of the endless belt for supporting the roll by contacting the outer peripheral face thereof will vary in accordance with the total length of the film stored in the form of roll. Then, if a tension pulley is additionally provided for maintaining tension in the belt regardless of the outer diameter of the roll, the roll may be supported and rotatably driven constantly in stable manner from the start to end of the film take-up operation.

Alternatively, there may be provided a dancer roller for pressing the roll against the pair of rotary rollers, the dancer roller being partly responsible for maintaining the film roll in the magazine in circular shape. With this, the tension required in the timing belt may be reduced. Further, the dancer roller may also serve to restrict wobbling movement of the roll which tends to occur when the rotational drive of the film roll by the dancer roller is started, accelerated or decelerated.

If the tension pulley is disposed on the opposite side of the pair of rotary rollers across the roll, the dancer roller and the tension pulley may be disposed by using a free space which expands or contracts to the opposite side of the pair of rotary rollers across the roll in association with the increase/decrease in the diameter of the roll. As a result, the entire film magazine may be formed more compact advantageously. In this case, the dancer roller may be rotatably supported on the support member for supporting the tension pulley.

In the case of the above construction, the dancer roller may be supported on the stationary support member to be movable relative to the pair of rotary rollers, with the dancer roller being urged toward the rotary rollers. In this way, the effective contact between the dancer roller and the roll may be maintained constantly, irrespectively of change in the position of the tension pulley and the associated support member corresponding to the amount of increase/decrease in the outer diameter of the roll.

Preferably, there is provided a core for supporting the roll from an inner peripheral face thereof. With this, the following advantage may be obtained. Namely, at the very beginning of the take-up operation of the film when no portion of the film has yet been stored in the form of roll, the film would first have to be wound manually outside the magazine into the form of roll and then mount thus formed roll to the inner peripheral face of the belt disposed inside the magazine. The above construction eliminates this operation. In the case of this construction, the take-up storing operation of the film may be initiated right away simply by inserting the leading end of the film to be stored into an interface formed between the core pre-mounted to the inner peripheral face of the belt inside the magazine and the belt member.

Alternatively, there is provided means for limiting within a predetermined line segment the movement of the axis of the core associated with variation in the outer diameter of the roll. In this case too, the wobbling movement of the roll tending to occur at the start, acceleration or deceleration of the rotational drive of the film roll may be effectively restricted. In addition, this construction does not require the dancer roller.

Preferably, in the above construction, the shaft member is provided as projections projecting respectively from opposed side faces of the core, and the limiting means comprises guide slots capable respectively of receiving the projection therein and extending along the predetermined line segment. Conversely, recesses may be provided centrally in the opposed sides of the core, while the shaft member may be provided as a shaft which is movably supported to a case member of the film magazine and received within the recesses.

Preferably, the belt comprises a pair of belts respectively coming into engagement with opposed rows of perforations formed in the film. With this, the film to be stored may be held and driven via the perforations thereof. As a result, with this construction, the image-recorded area of the film is less likely to be damaged.

According to one aspect of the invention, the tension pulley and the support member for supporting the tension pulley are provided independently to each of the two belts. With this construction, even if there exists or develops difference in the length between the two belts, the constructions may assure reliable contact between the both of the two belts and the drive roller and the outer peripheral face of the film roll (without slipping or the like therebetween). As a result, the storing and retrieving operations of the film may be controlled accurately, without e.g. weaving of the film(s).

According to a further aspect of the invention, the drive roller includes engaging teeth in the outer periphery thereof, whilst the belt is provided as a toothed timing belt engageable with the engaging teeth of the drive roller. This construction provides the advantage of more reliable transmission of the rotational drive force from the drive roller provided by a motor or the like to the belt. Consequently, the storing and retrieving operations of the film may be controlled in an accurate manner.

Preferably, a pair of auxiliary timing pulleys for maintaining tension in the timing belt are provided for each of the two timing belts, with the pair of auxiliary timing pulleys being adapted to be rotatable relative to each other. With this, even if there occurs jumping or skipping of a tooth of either belt relative to either timing pulley, this will less likely result in excessive reduction or increase in the tension on the timing belt. As a result, this construction may prevent such accident as weaving of the transported film.

Preferably, there is provided a case for accommodating the film roll therein, and this case includes a first case member and a second case member which are pivotable relative to each other about an axis between a closed state in which the roll or core is rotatably driven via the belt and an opened state in which the film or core may be taken out of the film magazine.

In the above construction, the guide slot may be formed in either one of the first case member and second case member.

Still preferably, a stopper is provided at one end of the guide slot adjacent the roller, so that the core is pressed against the stopper by means of the belt in association with a pivotal operation of the case member to the opened state. This arrangement may avoid possibility of the core jumping out of the film magazine by the belt tension in the course of the pivotal operation of the case member to the opened state.

Further and other features, objects and advantages of the invention will become more apparent from the following detailed description of preferred embodiments of the present invention with reference to accompanying drawings.

BRIEF DESCRIPTION OF THE DRAWINGS

FIG. 8 is a schematic side view showing a film magazine according to a fourth embodiment of the invention, FIG. 21 is a front view illustrating an opening/closing operation of the film magazine of FIG. 16, FIG. 23 is a schematic side view showing a conventional film magazine.

DETAILED DESCRIPTION OF THE PREFERRED EMBODIMENTS

A film magazine according to a first embodiment of the present invention will be described next. The following description is based on an assumed situation in which a reprinting operation of a photographic film (negative) is to be carried out using a photographic printer processor (an example of printer apparatus) from piece films ('negative pieces', hereinafter) provided by a customer based on a customer's order for reprint.

Issuance of "Order Label"

Figure 1:
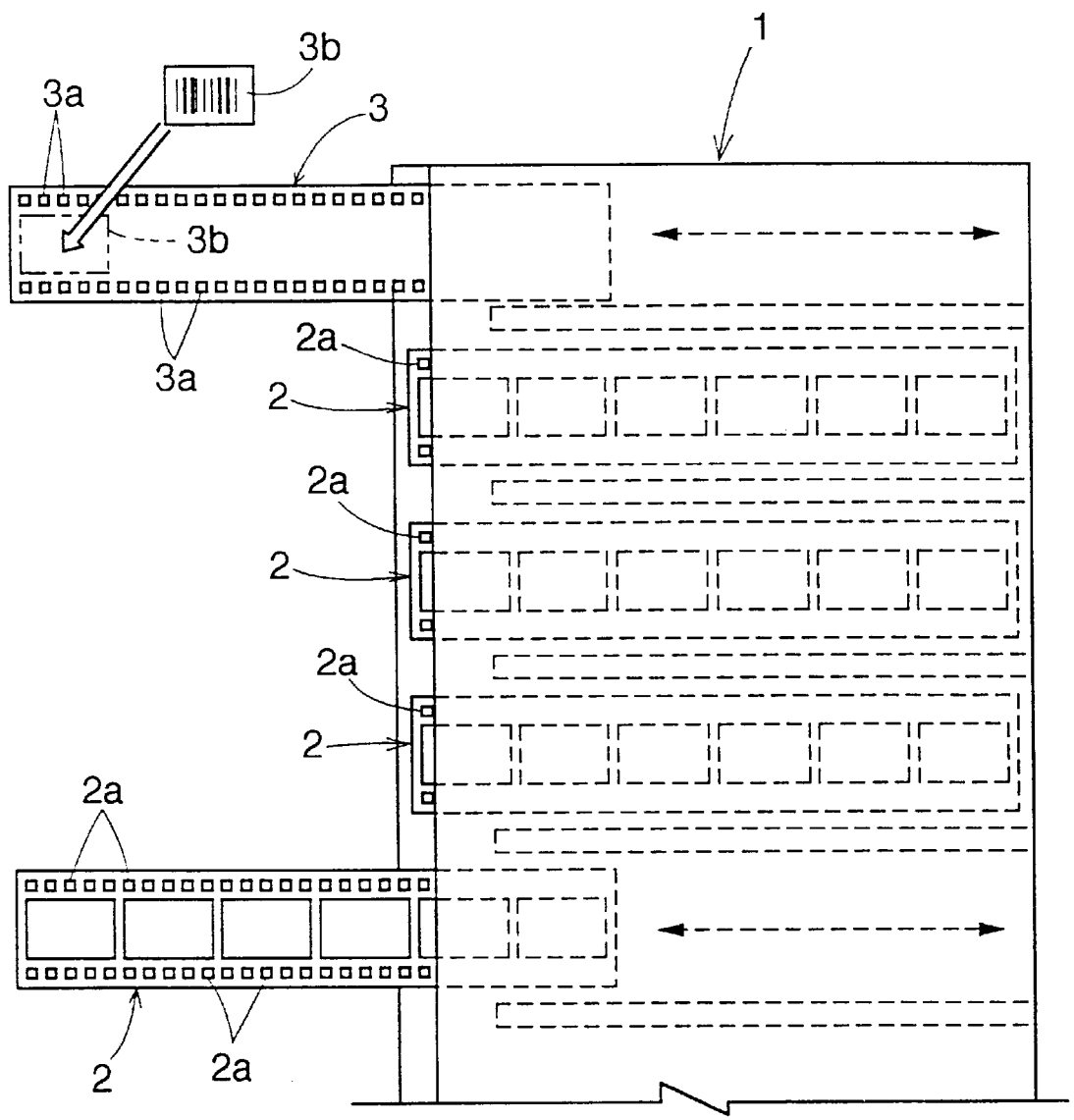
FIG. 1 is a plan view showing a negative envelope for storing therein a customer's order piece as a customer's order identifier and a plurality of negative pieces.

First, in the assumed situation described above in this embodiment, when a photographic laboratory shop receives a customer's order for photographic reprint, as shown in FIG. 1, the shop will issue an order label 3b printed with order-identifying data in the form of barcode, including such information as the name of customer, time/date of the order reception, number of reprints to be made, serial number of frame(s) to be reprinted, etc. Then, this order label 3b is attached to an 'order piece' 3, which then is inserted into a row pocket of a negative envelope 1.

The order piece 3 mentioned above is made of a transparent film material configured identical to one piece negative 2 with a non-transparent layer being formed thereon with leaving portions thereof corresponding to rows of perforations 3a of the piece negative 2 transparent, so that these transparent portions provide 'fake' perforations 3a. With this, transported condition of this order piece 3 may be monitored by means of an optical sensor. The order piece 3 should be made similar to the piece negative 2 in the configuration and elasticity thereof. Therefore, this order piece 3 can be made by cutting an un-exposed or full exposed negative into a piece. In this case, the fake perforations 3a are identical in shape and function to the perforations 2a of the negative piece 2.

Mounting of Film to Film Magazine

Next, all of the order piece 3a and negative pieces 2 are to be stored in a film magazine 10a constructed according to the first embodiment of the present invention.

Figure 2:
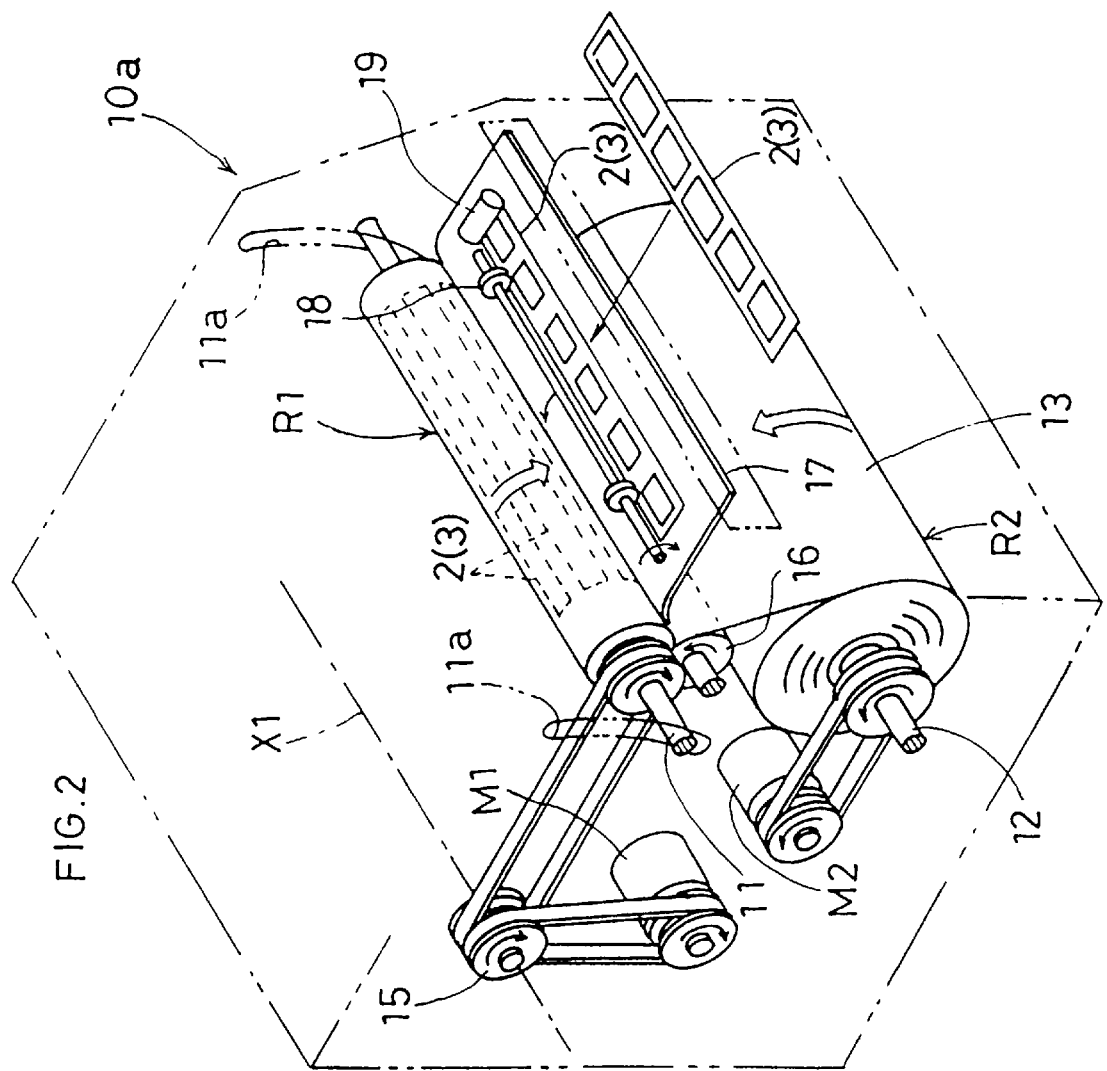
FIG. 2 is a schematic perspective view of a film magazine according to the invention.
Figure 3:
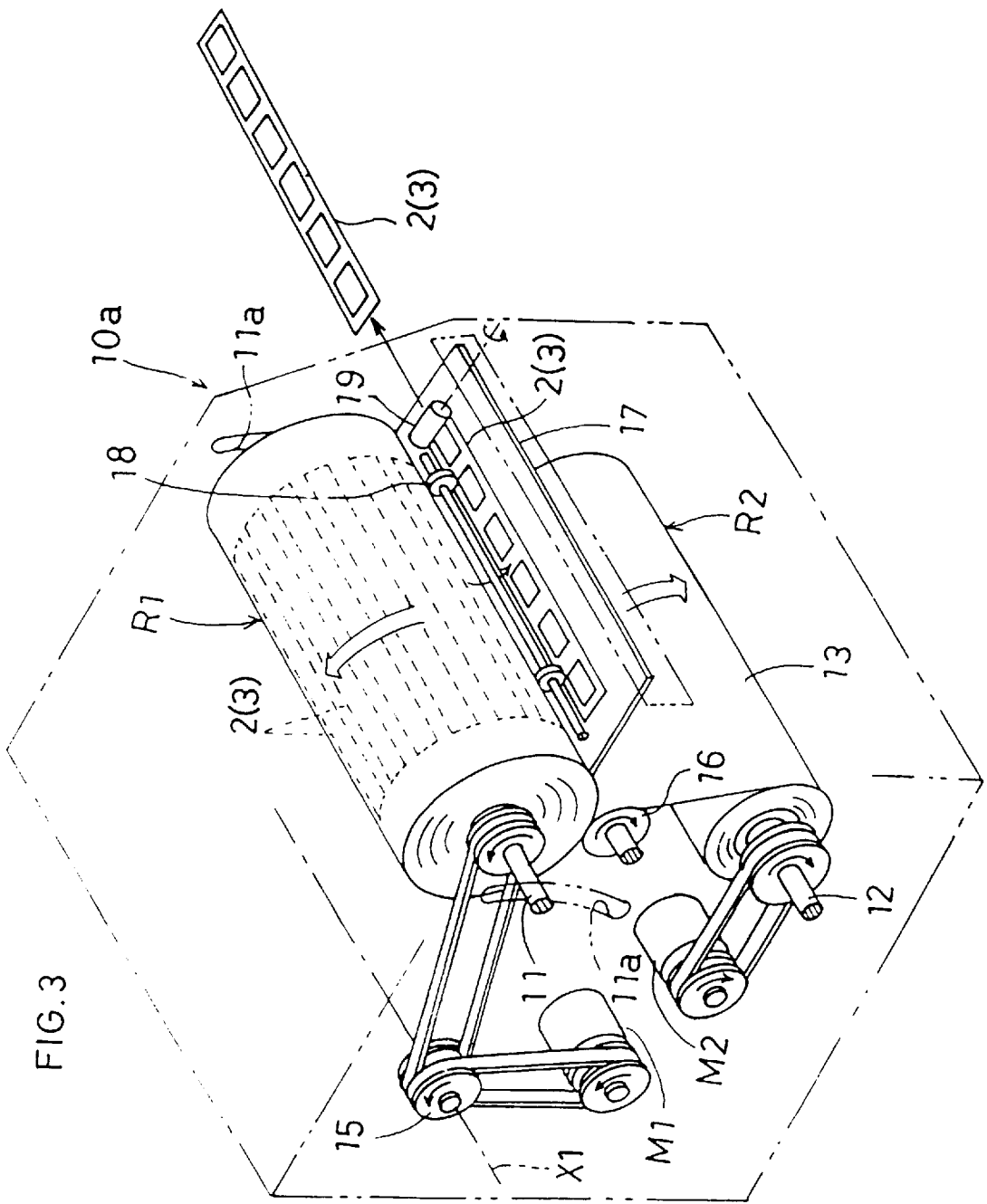
FIG. 3 is a schematic perspective view showing the film magazine of FIG. 2 under a different condition.

As shown in FIGS. 2 and 3, the film magazine 10a includes a first core member 11 for taking up an elongate storage tape 13 and a second core member 12 for unwinding the storage tape 13 from the first take-up core member 11 (the first take-up core member 11 and the second take-up core member 12 together constitute a take-up/unwinding mechanism). The first take-up core member 11 and the second take-up core member 12 can be driven to rotate in either desired direction by means of step motors M1, M2, respectively. FIG. 2 shows a condition before a take-up operation of the storage tape 13 on to the first take-up core member 11 is initiated. FIG. 3 shows a further condition when the take-up operation of he storage tape 13 on to the first take-up core member 11 has advanced.

As may be understood from FIG. 2, the storage tape 13 has a lateral width sized to be capable of storing or holding thereon a negative piece having 6 (six) frames.

As shown in FIGS. 2 and 3, the axis of the first take-up core member 11 is movable within an elongate slot 11a. This slot 11a is configured as an arc centering about a rotational axis X1 of a pulley 15 for rotating the first take-up core member 11. As the first take-up core member 11 is constantly urged downward by its own weight, the storage tape 13 taken up about the first take-up core member 11 is kept pressed against a stationary roller 16.

Accordingly, for taking up the storage tape 13 on to the first take-up core member 11, as negative pieces 2 are fed one after another on a guide table 17, these fed negative pieces 2 are guided, by a feed roller 18 (an example of feed mechanism) disposed on the guide table 17, to a roll-forming portion of the first take-up core member 11, that is, on to the surface of the storage tape 13, so that the pieces 2 are stored in series between adjacent windings of a roll R1 of the storage tape 13. In this, the storage of the negative piece 2 within the roll R1 of the storage tape 13 is effected in such a manner that the longitudinal direction of each negative piece 2 is oriented to traverse the take-up direction of the storage tape 13.

Attachment of Film Magazine to Negative-Piece Feeder Device

Next, the film magazine 10a having stored the plurality of negative pieces 2 therein in the manner above is attached to a negative-piece feeder device 100. After the attachment, as the storage tape 13 taken up in the form of roll about the first take-up core member 11 is unwound on to the second take-up core member 12, the stored negative pieces 2 are released one after another in the reverse order on to the guide table 17, and these released pieces 2 are discharged and collected one after another by a discharging roller 19 in a direction traversing the take-up direction of the storage tape 13 and transported eventually to the negative-piece feeder device 100 incorporated within the printer processor.

Reprinting Operation

Figure 4:
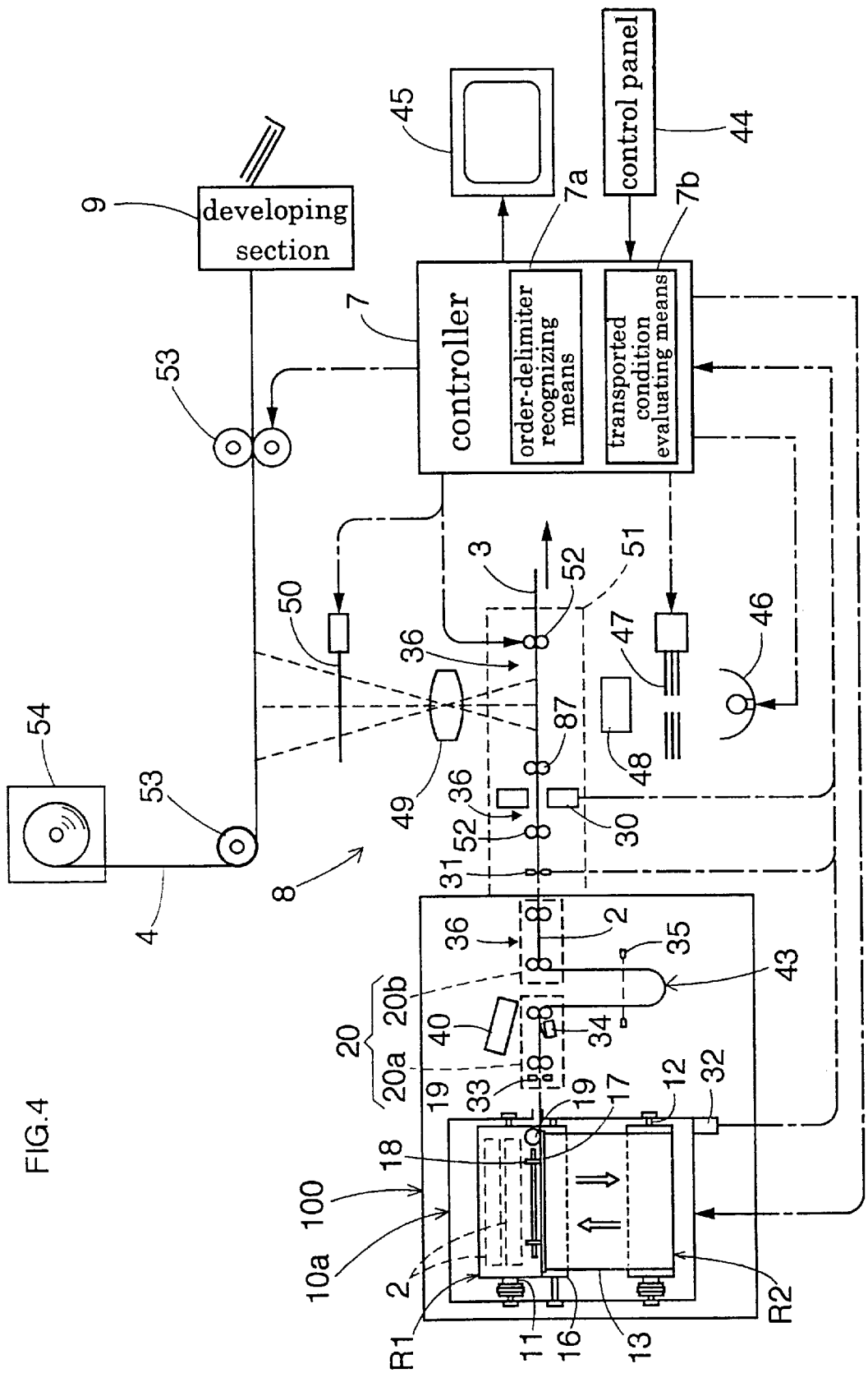
FIG. 4 is a block diagram of a photographic printer processor employing a negative-piece feeding device.

FIG. 4 is a block diagram of the printer processor. This figure shows a condition of the processor when used for effecting a reprinting operation by processing the negative piece 2. As described hereinbefore, this printer processor includes the negative-piece feeder device 100 for feeding one by one the plurality of stored negative pieces 2, to which device the film magazine 10a of the invention may be detachably attached. The printer processor further includes an exposure section 8 for projecting and exposing an image recorded in the negative piece 2 on to a printer paper 4, a developing section 9 for developing the exposed print paper 4, and a controller 7 for controlling operations of various components of the processor.

The controller 7 is connected to an operator console 44 for allowing input of a variety of control instructions and a monitor 45 for displaying an image of the negative piece 2 read by a scanner 30. When a negative piece 2 to be reprinted is fed to the exposure section 8 by the negative-piece feeder device 100, the image of the frame to be printed of the negative piece 2 is read by the scanner 30, and its image information is transmitted to the controller 7. Based on the transmitted image information, the controller 7 determines exposure conditions, generates a simulated image which would be obtained if the image were projected and exposed on to the print paper 4 based on the determined exposure conditions and causes the monitor 45 to display this simulated image.

The exposure section 8 includes a light-modulating filer assembly 47 for adjusting color balance of light irradiated from an exposure light source 46 by projecting or retracting color filters of yellow, magenta and cyanogen relative to an optical path, a mirror tunnel 48 for uniformly mixing color components of the light whose color has been balanced by the light-modulating filter assembly 47, a shutter 50, and an automatic negative masking device 51 which provides a transport path along which the negative piece 2 is transported to an exposing point. The automatic negative masking device 51 incorporates therein the scanner 30 described above and also other components such as a drive roller 52 for transporting the negative piece and a negative detecting sensor 31.

The print paper 4 is taken out from the print paper magazine 54 by a drive roller 53, and after its exposure, the paper 4 is advanced to the developing section 9.

In the exposure operation, the positions of the respective color filters of the light-modulating filter assembly 47, an opening period of the shutter 50, i.e. the exposing period, are controlled appropriately. An operator of the printer processor observes the simulated image displayed on the monitor 45 and can input via the operator console 44 an instruction for correcting the determined exposure conditions, if he/she finds the displayed image inappropriate. Then, in response to the input of correcting instruction, the controller 7 modifies the exposure conditions and determines final exposure conditions, based on which the controller 7 controls operations of the various components of the exposure section 8, so that an image of the frame in the negative piece 2 is projected and exposed on to the print paper 4 having been withdrawn from the print paper magazine 54.

The negative-piece feeder device 100 includes the film magazine 10a provided as the attachable/detachable cassette described hereinbefore and a negative transporting mechanism 20 for transporting the negative piece 2 taken out of the film magazine 10a to the automatic negative masking device 51.

The negative transporting mechanism 20 includes, as two separate components thereof, a first transporting unit 20a disposed on the side of the film magazine and a second transporting unit 20b disposed on the side of the automatic negative masking device 51, and between these units 20a, 20b, there is formed a loop-forming section 43 for temporarily storing the negative piece 2 or order piece 3 in the form of a loop suspended from the transporting path.

The negative-piece feeder device 100 includes various sensors operatively connected with the controller 7 for controlling various operations. These sensors include, for instance, a storage-unit detecting sensor 32 for confirming attachment of the attachable/detachable film magazine 10a, a first negative detecting sensor 33 for detecting either the negative piece 2 or order piece 3 in the vicinity of the exit of the film magazine 10a, a second negative detecting sensor 34 for detecting the piece 2 or 3 immediately before the loop-forming section 43, and a loop detecting sensor 35 for detecting the negative piece 2 or order piece 3 temporarily stored in the form of loop at the loop-forming section 43, with these sensors being disposed at respective appropriate positions.

The controller 7 incorporates therein an order-delimiter recognizing means 7a which is constructed substantially in the form of a program. The recognizing means 7a recognizes an order delimiter by processing a signal from the first negative detecting sensor 33 inputted to the controller 7, so that the recognition may be utilized in a subsequent process such as sorting of finished prints. This recognition of order delimiter by the order-delimiter recognizing means 7a may be easily realized by well-known principle, based on pattern of detection signal from the first negative detecting sensor 33 for the negative piece 2 or order piece 3 or on a signal from a predetermined detecting point for the order piece 3.

The controller 7 further incorporates therein a transported condition evaluating means 7b which also is constructed substantially in the form of a program. This evaluating means 7b checks transported condition, e.g. presence of transport jam, of the negative piece 2 or order piece 3, based on a signal from the negative transportation checking sensor 36 for detecting the perforations of the negative piece 2 or order piece 3.

Figure 5:
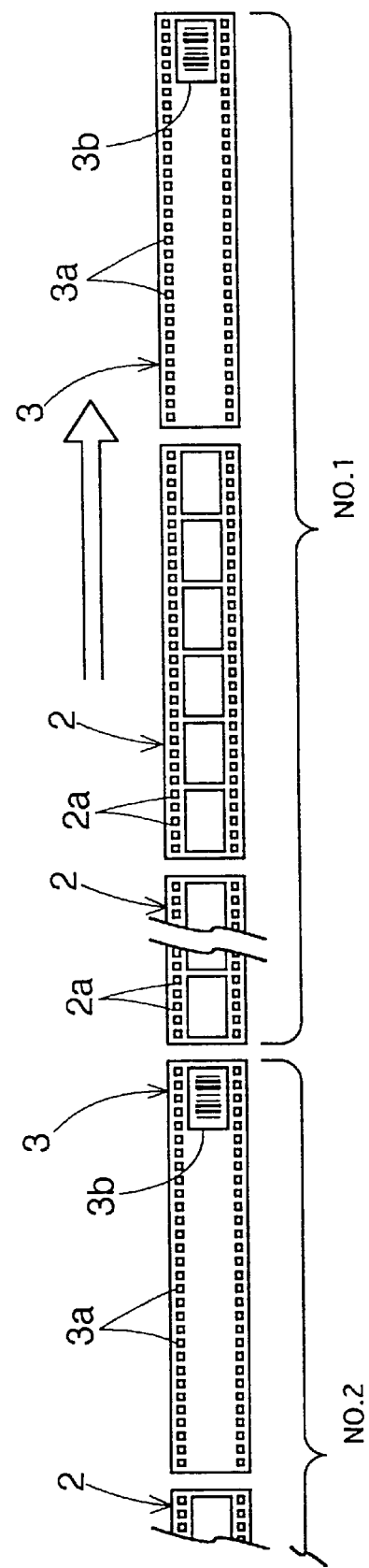
FIG. 5 is a descriptive view illustrating a serial arrangement of the order piece and negative pieces for transportation thereof.

As shown in FIG. 5, the negative pieces 2 and the order piece 3 fed from the negative-piece feeder device 100 to the exposure section 8 are arranged in series, with the order piece 3 for one order being followed by the negative piece 2 to be reprinted. That is to say, the order piece 3 per se provides the delimiter for the one reprint order. In the order label 3b affixed to the order piece 3, data required for the reprinting operation are recorded in the form of barcode. Thus, by reading this barcode, the controller 7 may obtain such information as to which frame image in the negative piece 2 following the order piece 3 is to be printed for how many copies and controls the respective components of the exposure section 8 in accordance therewith.

Negative-Piece Feeder Device

Next, the functions of the negative-piece feeder device 100 will be described in details.

When the film magazine 10a having stored therein the order piece 3 and the negative pieces 2 in the form of roll is attached to the negative-piece feeder device 100, this attachment is detected by the storage-unit detecting sensor 32, which then informs this attachment of film magazine 10a to the controller 7. If the automatic negative masking device 51 is ready for receiving a negative piece, the step motors M1, M2 are activated, upon which a unwinding operation is started for unwinding the storage tape 13 stored about the first take-up core member 11 on to a roll R2 on the second take-up core member 12. With this, first the order piece 3 is fed from the discharging roller 19. When the first negative detecting sensor 33 detects its order label 3b, this order piece 3 is stopped at a position where its barcode is read by a barcode reader 40, which in turn transmits the reprint information contained in the barcode to the controller 7. Then, a solenoid associated with the loop-forming section 43 is activated to allow passage of the order piece 3.

The order piece 3 is caused to just pass through the second transporting unit 20b and the automatic negative masking unit 51 to be discharged to the outside. In succession, the negative piece 2 is fed from the discharging roller 19 and then transported by the first transporting unit 20a and second transporting unit 20b to the automatic negative masking unit 51. In the course of this process, when the negative detecting sensor 31 detects arrival of the leading end of the negative piece 2 at the first driving roller 52 of the masking unit 51, the driving roller 52 transports the piece 2. In this way, inconvenience due to possible difference between the transporting speeds of the second transporting unit 20b and automatic negative masking unit 51 may be avoided. After the negative piece 2 fed into the automatic negative masking unit 51 is fixed in position to bring a frame to be exposed at the exposing point, the frame is exposed according to the predetermined steps and then discharged. In this manner, a plurality of negative pieces 2 are exposed one after another. In the course of this, the transported condition of the negative piece 2 or order piece 3 is monitored by the negative transportation checking sensor 36 which detects the perforations 2a or fake perforations 3a. Then, if the sensor 36 detects jamming of pieces inside the automatic negative masking unit 51, a lid (not shown) provided above the loop-partitioning section 43 is opened to allow a subsequent negative film 2 to be formed into a loop upwardly of the loop-forming section 43.

Until all image exposure operations of the negative piece 2 for one order are completed, an order piece 3 for the next order is caused to wait at the reading point by the barcode reader 40.

Instead of affixing the order label 3b recording reprint information in the form of barcode to the order piece 3, the barcode may directly be recorded in the order piece. Further alternatively, instead of such barcode method, the order piece 3 per se may be constructed as a mark sheet. In the latter case, the barcode reader 40 will be replaced by a mark-sheet reader. In addition to these recording methods, other methods such as magnetic, optical methods may also be employed, depending on the convenience.

Next, second, third and fourth embodiments of the present invention will be described.

In the first embodiment described above, the take-up mechanism includes a drive roller which is driven to rotate for taking up the elongate storage tape in the form of a roll, during which a plurality of films (negative pieces) are stored one after another between adjacent windings of the roll. Instead of this, in further embodiments described below, a plurality of films (negative pieces) are spliced end-to-end along the length thereof to form one elongate film assembly. And, this film assembly is directly wound about a take-up core member, without using any storage tape. The specific construction of this spliced film assembly is not particularly limited in the present invention. For example, the assembly may consist of plural negative pieces of a same length spliced together or of different lengths such as 24-frame entire negative films and/or 36-frame entire negative films, or may be a combination of such entire negative films and negative pieces. Further, the order piece recording exposure conditions or the like may be interposed between these films or pieces.

Second Embodiment

Figure 6:
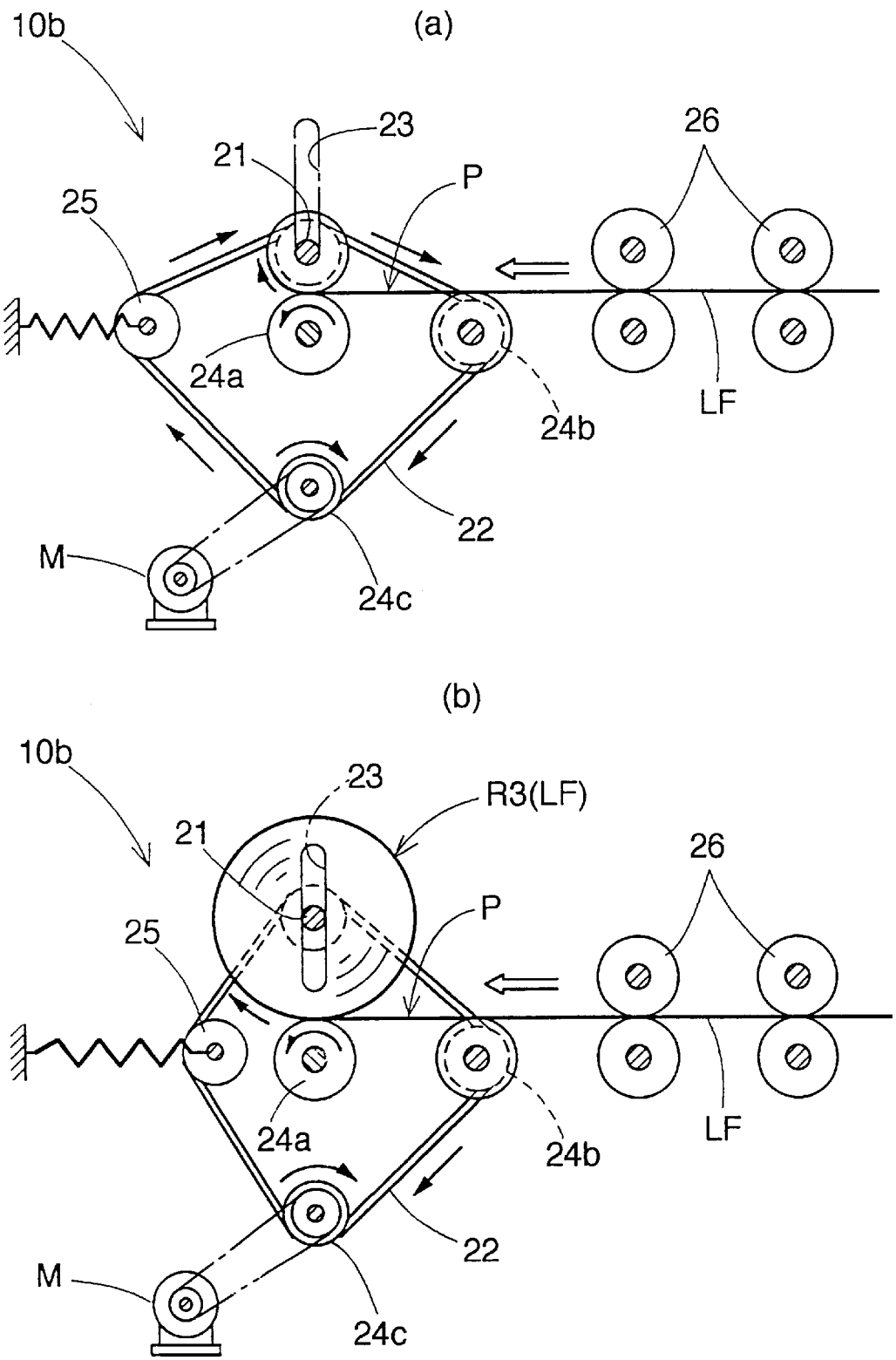
FIG. 6 is a schematic side view showing a film magazine according to a second embodiment of the invention.

FIG. 6 shows a film magazine 10b according to the second embodiment of the present invention, which is one specific exemplary construction of the above-described type. In this embodiment, the take-up mechanism includes, as shown in FIG. 6(a), a cylindrical shaft member 21 capable of taking up an elongate spliced film assembly LF about an outer periphery thereof and an endless drive belt 22 for rotatably driving the shaft member 21. The drive belt 22 is entrained about the shaft member 21, pulleys 24b, 24c both having the axes thereof fixed, and a tension pulley 25 having a movable axis. The pulley 24c is the drive pulley rotatably driven by a motor M.

With an end of the elongate spliced film assembly LF fixed to the shaft member 21, as the pulley 68c is driven in a predetermined direction, the drive belt effects an orbital movement to rotate the shaft member 21, so that the film assembly LF is wound about the outer periphery of the shaft member 21 to form a film roll R3. By means of the functions of the drive belt 22 and the tension pulley 25 and also the weight of the shaft member 21, the outermost layer of the roll R3 is constantly urged against the free roller 24a whose axis is fixed in position; and the shaft member 21 is supported to be movable within an elongate slot 23, the shaft member 21 is moved upward within the slot 23, in association with increase in the radius of the film roll R3. As a result, a transit path P of the film assembly LF moving on to the roll R3 may be maintained fixed, irrespectively of the increase in the radius of the roll R3.

When the drive belt 22 is driven reversely with the film assembly LF being pulled to the outside of the film magazine (to the right-handed side in FIG. 6) by feeder rollers 26, the film assembly LF is released from the roll R3 and transported to the exposure section of the printer processor. In this case too, in the same principle as described above, the transit path P of the film assembly LF withdrawn from the roll R3 may be maintained constant, irrespectively of decrease in the radius of the roll R3.

Third Embodiment

Figure 7:
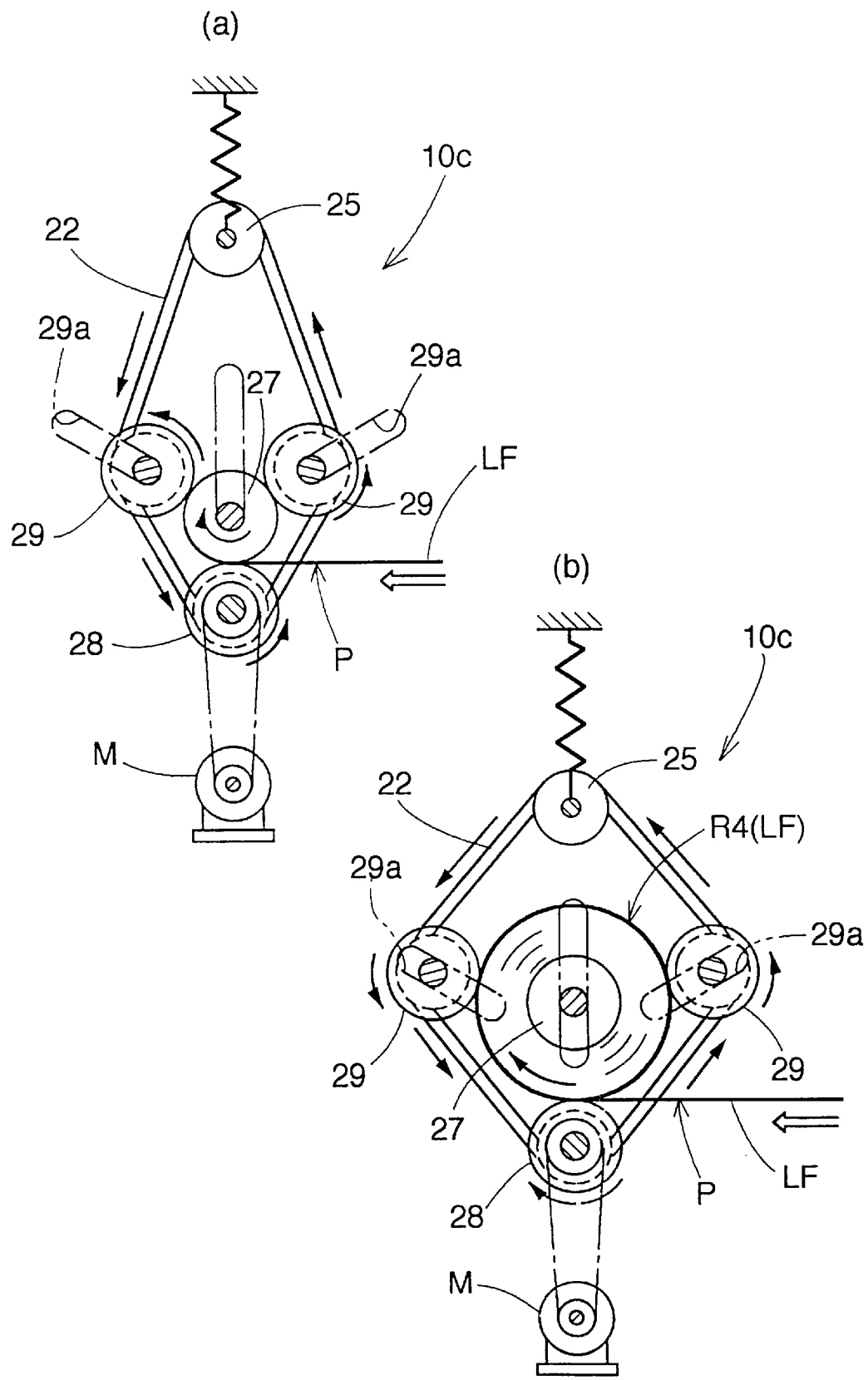
FIG. 7 is a schematic side view showing a film magazine according to a third embodiment of the invention.

In the second embodiment described above, for taking up an elongate film assembly comprising a plurality of films or film pieces spliced together about a shaft member or the like without using a storage tape, the film assembly is formed into a roll by means of rotational force of the shaft member about which the film assembly is wound. Alternatively, in a third embodiment of the present invention shown in FIG. 7, there is provided a film magazine 10c adapted to store the elongate film assembly therein by rotating the film roll formed on a shaft member by means of a rotational force applied onto the outer peripheral surface of the roll.

In this embodiment, as shown in FIG. 7(a), a take-up mechanism includes a cylindrical shaft member 27 capable of taking up the elongate spliced film assembly LF about an outer periphery thereof, and this shaft member 27 is surrounded and bound by a first roller 28 having an axis fixed in position, and an opposed pair of second rollers 29, 29 movable, relative to the first roller 28, within respective elongate slots 29a associated therewith. And, between the slots 29a, 29a and the second rollers 29, 29, there is respectively provided a compression spring (not shown) for urging the second rollers 29, 29 toward the first roller 28. As a result, the second rollers 29, 29 press the roll R4 of the film assembly LF against the first roller 28.

The first roller 28 comprises the drive roller rotatably driven by a motor M. An endless drive belt 22 is entrained about the first roller 28, second rollers 29, 29 and the tension pulley 25. Accordingly, with an end of the elongate spliced film assembly LF fixed to the shaft member 27, as the first roller 28 is driven in a predetermined direction, the drive belt effects an orbital movement, so that the second rollers 29, 29 too are rotated in the same direction and at the same speed as the first roller 28. As a result, the film assembly LF is wound about the outer periphery of the shaft member 27 to form a film roll R4 as shown in FIG. 7(b).

As shown in FIG. 7(b), as the second roller 29, 29 is moved upward within the elongate slot 29a in association with increase in the radius of the roll R4, the lower portion of the outer periphery of the roll R4 is constantly kept pressed against the first roller 28 whose axis is fixed in position. Therefore, the transit path P of the film assembly LF moving on to the roll R4 may be maintained fixed, irrespectively of increase/decrease in the radius of the roll R4.

In the case of the construction of this embodiment, the film assembly is taken up not by the drive force of the shaft member 27, rather, the formed film roll per se is rotated from the outside. Hence, unlike the second embodiment, both the speed of the film assembly LF moving on to the roll R4 and the speed of the same moving away from the roll R4 are maintained constant, irrespectively of variation in the radius of the roll R4.

Fourth Embodiment

In the third embodiment described above, for storing an elongated spliced film assembly by rotating the film roll formed on a shaft member from the outer periphery of the roll, the film roll formed about the shaft member is rotated with the outer periphery of the film roll being supported by means of a plurality of cylindrical members (rollers). Alternatively, in the case of a fourth embodiment of the invention shown in FIG. 8, there is provided a still further film magazine 10d which is adapted to store the elongate film assembly with the roll of the film being supported by a belt member from the outer periphery of the roll. In this embodiment, the take-up mechanism includes a cylindrical shaft member 37 capable of taking up the elongate spliced film assembly LF about an outer periphery thereof and an endless drive belt 22 which supports the roll R5 of the film LF wound about the shaft member 27 from the outer periphery thereof. The endless drive belt 22 is entrained about three rollers 38a, 38b 38c having respective axes thereof fixed in position and one tension roller 25 supported by a pull spring, and the belt 22 is further turned around to be entrained about the shaft member 27. The roller 38a is the drive roller rotatably driven by a motor M. Further, the shaft member 37 is supported to be movable within a vertically extending elongate slot 37a and also this shaft member 27 is urged against a stationary roller 39 by means of a pull spring 42 (an example of means for pressing a shaft member against a belt).

Accordingly, with an end of the elongate film LF being fixed to the shaft member 37, as the roller 38a is driven to rotate in a predetermined direction, the shaft member 37 is rotated by the endless drive belt 22, so that the shaft member 37 takes up the elongate film LF about the outer periphery thereof. When the radius of the roll R5 of the film assembly LF formed on the shaft member 37 has increased, the position between the roll R5 an the belt 22 may be maintained fixed. That is, the transit path P of the elongate film LF may be maintained fixed, irrespectively of increase/decrease in the radius of the roll R5.

Also, in this fourth embodiment, as the support and rotational drive of the roll of the film formed by its winding are provided by the endless drive belt, this mechanism can store, according to a predetermined order, a plurality of non-spliced separate negative pieces or the like as well. Further, with this construction, it is easy to form the entire apparatus compact. Moreover, as the belt provides both the support and rotational drive of the film roll (the film roll need not be pressed directly from its outer periphery by means of rollers or the like), the film may be held in a stable manner within the magazine, even when the degree of roundness of the outer contour of the film roll is low. In addition, this construction reduces the risk of friction between the film and the magazine when the former is taken in and out of the latter.

Fifth Embodiment

FIGS. 9 through 13 show a fifth embodiment of the present invention which is a modified construction of the fourth embodiment described above.

Figure 11:
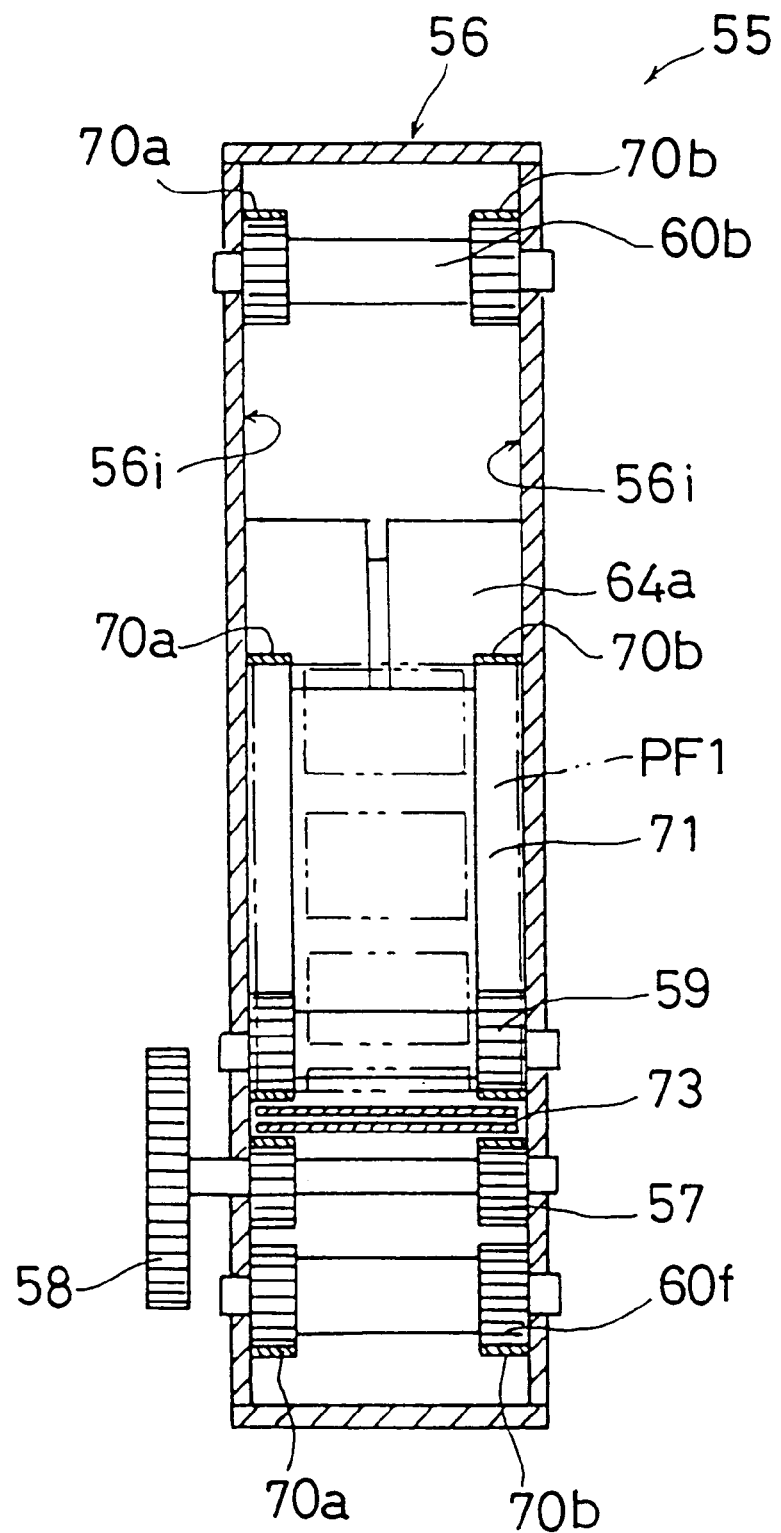
FIG. 11 is a side view of the film magazine of FIG. 9.

As shown in FIG. 11, a film magazine 55, according to this embodiment, includes a case member 56 having inner side faces 56i, 56i finished with high degree of surface smoothness. The inner side faces 56i, 56i are spaced apart from each other with a distance slightly greater than a 35 mm film PF1. The inner side faces 56i, 56i rotatably support therebetween one timing pulley 57 as a drive pulley rotatably driven by an external rotational drive force and a plurality of further timing pulleys 59, 60a, 60b, 60c, 60d, 60e, 60f having respective rotational axes thereof fixed in horizontal orientation.

Further, between the opposed inner side faces 56i, 56i, there is disposed a cylindrical core 71 made of synthetic resin to be rotatable and have its axis movable. And, this core 71 can be removed out of the case member 56. The width of the core 71 is sized in such manner that it is freely movable and rotatable without excessive "looseness" with the space between the inner side faces 56i, 56i.

Figure 9:
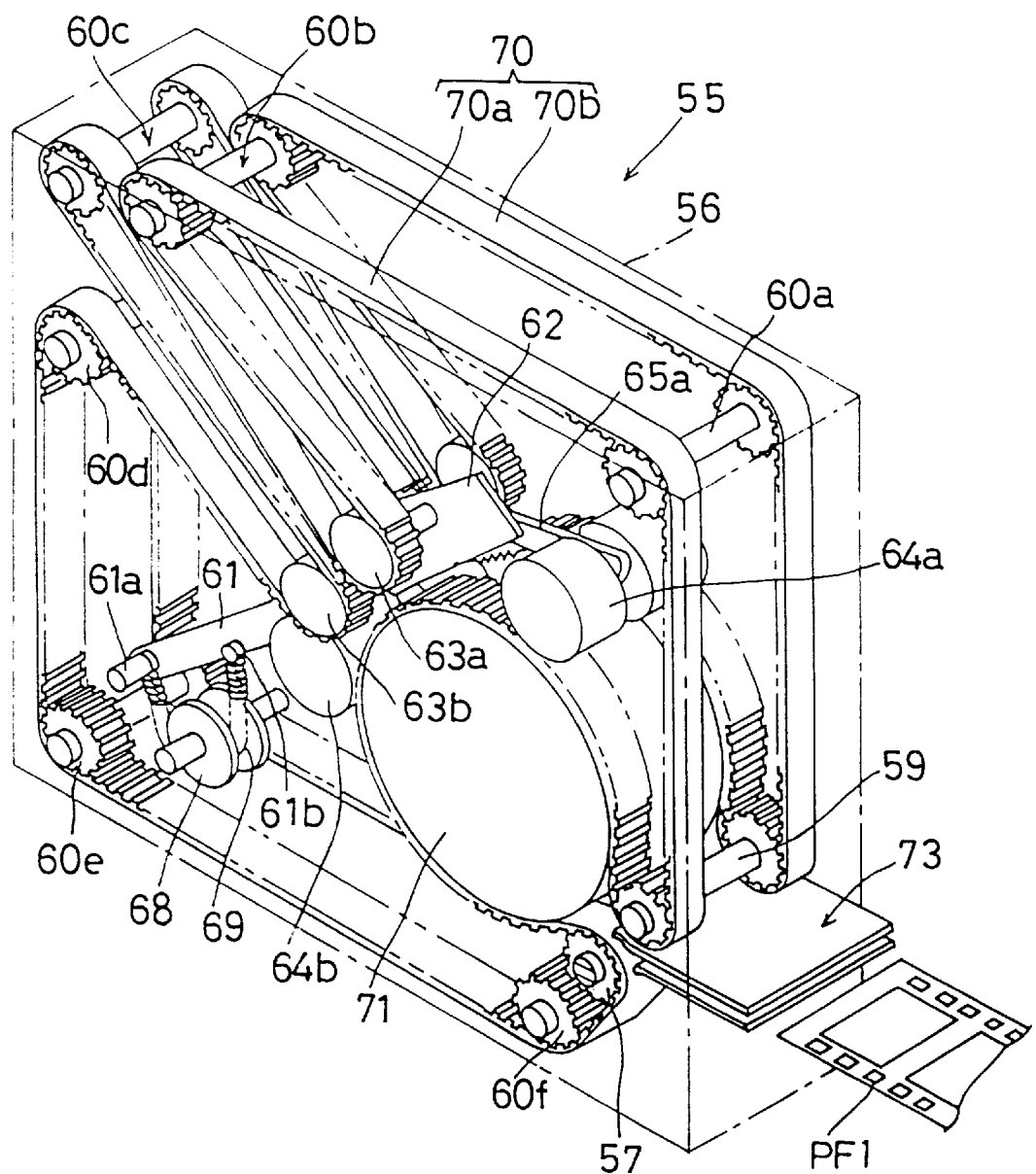
FIG. 9 is a schematic perspective view showing a film magazine according to a fifth embodiment of the invention.
Figure 10:
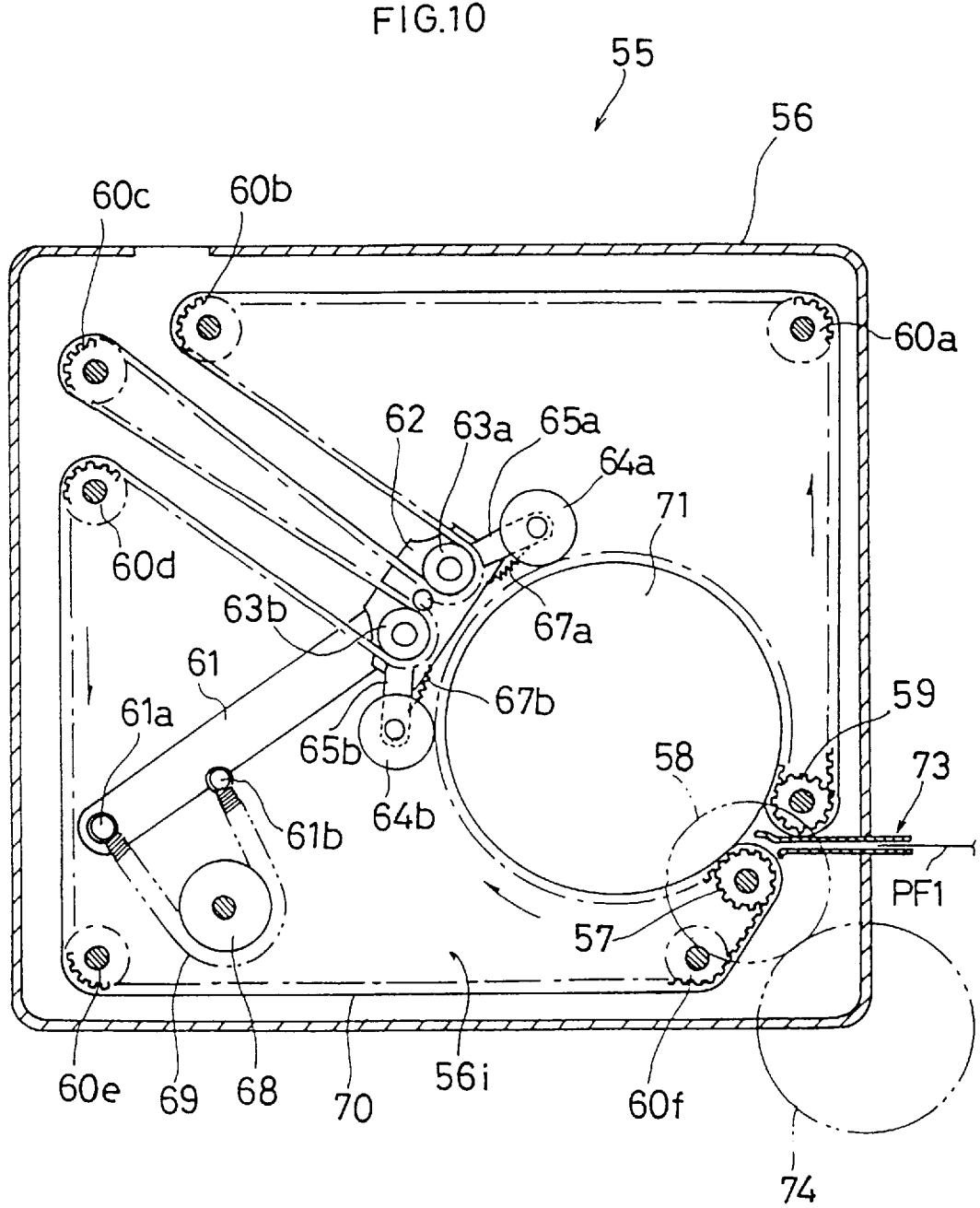
FIG. 10 is a front view of the film magazine of FIG. 9.

In the case member 56, there is also provided a toothed endless timing belt 70 having one portion thereof entrained about the core 71 and having the other portion thereof extending through between the timing pulleys 57, 59 and then entrained about the tiring pulleys 60a, 60b, 60c, 60d, 60e, 60f whose axes are fixed in position, as shown in FIGS. 9 and 10 for example. In the case member 56, there are further provided tension pulleys 63a, 63b for applying tension having a predetermined value to the timing belt 70. Therefore, the core 71 is constantly urged towards the timing pulleys 57, 59 by means of the belt 70. In other words, the timing pulleys 57 and 59 together constitute a pair of rotary members for supporting, via the belt 70, the core 71 or a roll of film to be formed on this core 71 in a manner described later. As a result, the core 71 or the film roll may constantly maintained in a stable manner inside the case member 56, regardless of the amount of film taken up about the core 71.

Incidentally, as shown in FIGS. 9 and 11, the timing belt 70 consists of a pair of parallel belt members 70a, 70b adapted to come into contact only the rows of perforations of a photographic film. On the other hand, the core 71 also has an annular peripheral groove at a widthwise middle portion thereof as shown in FIG. 11, so that this core 71 too can support the photographic film at the portion thereof except its image recorded area, i.e. mainly at the perforations thereof.

The tension pulleys 63a, 63b are rotatably supported to a bracket 62 pivotally supported to a leading end of a swing rod 61 which in turn is attached to the case member 56 to be pivotable about an axis 61a. The bracket 62 is urged by an urging mechanism via the rod 61 toward the core 71. The urging mechanism consists essentially of a pulley 68 rotatably disposed inside the case member 56 and having its axis fixed in position and a coil spring 69 having one end thereof fixed to the vicinity of the axis 61a and the other end thereof fixed to a pin 61b attached to an intermediate portion of the rod 61. An intermediate portion of this coil spring 69 is entrained about the rotatable pulley 68. The elastic resilience of the coil spring 69 which constantly tends to contract urges, via the pin 61b and the leading end of the rod 61, the bracket 62 and the tension pulleys 63a, 63b toward film guides 73 disposed between the timing pulleys 57, 59, so as to maintain tension on the timing belt 70. As a result, the core 71 surrounded by this belt 70 is pulled toward the timing pulleys 57, 59.

The timing pulley 57 acting as the drive pulley is adapted to engage and rotatable in unison with a gear 58 supported coaxial therewith; and this pulley 57 can be rotated in a controlled manner by means of a drive gear 74 which in turn is rotatably driven by an unillustrated step motor or the like. As the timing pulley 57 is driven to rotate by the external force, the timing belt 70 and the core 71 contacting the portion of the belt 70 too are driven to rotate.

Between the pair of timing pulleys 57, 59, the pair of film guides 73 having smooth surfaces are disposed horizontally as a film entrance/exit.

Then, when e.g. a negative piece PF1 is inserted from the film guides 73 toward the timing pulley 57 while rotating the timing pulley 57 and the timing belt 70 in the direction denoted with an arrow, the leading end of the negative piece PF1 is pinched between the timing belt 70 and the core 71 and is pulled along a tangential direction to the timing pulley 57 and to the core 71. Then, the entire negative piece PF1 will be wound about the outer periphery of the core 71. That is, the negative piece PF1 will be gradually stored between the outer peripheral face of the core 71 and he timing belt 70 entrained about the core 71.

Figure 12:
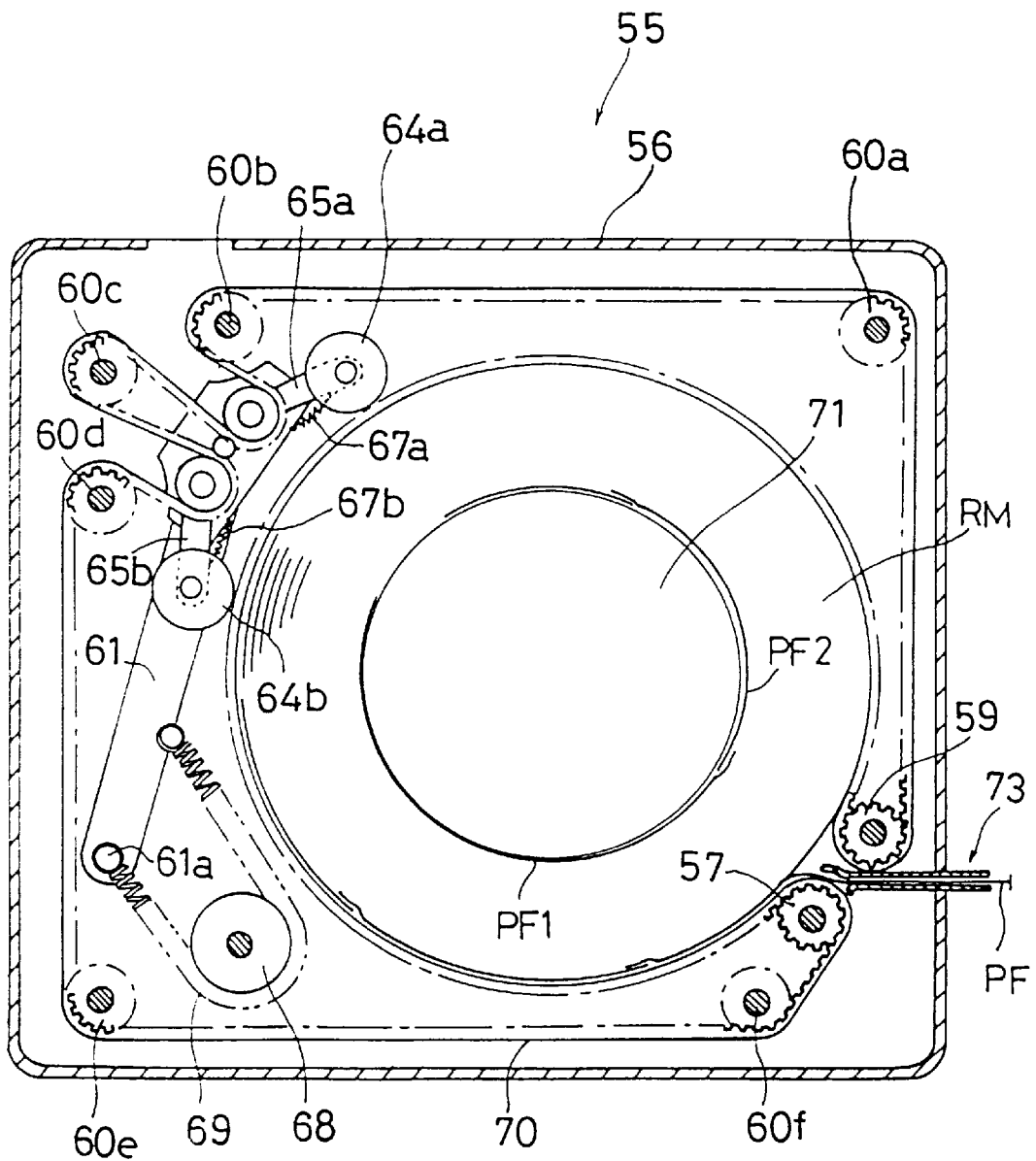
FIG. 12 is a front view showing the film magazine of FIG. 10 in a different condition.

Further, as a number of negative pieces PF2, . . . PFn are inserted one after another following the first negative piece PF1, these pieces too can be stored in the same manner as above between the core 71 and the timing belt 70. With the above-described operation, as illustrated in FIG. 12, a roll RM of the negative pieces RM will be formed on the outer periphery of the core 71 (because, the roll RM bound between the core 71 and the belt 70 too are rotated via the timing belt 70 with the rotation of the timing pulley 57). Within this film roll RM, the original inserting order starting with the first-inserted negative piece PF1 (located at the innermost position of the roll RM) until the last-inserted negative piece Pn (located at the outermost position of the roll RM and contacting the timing belt 70) is completely maintained.

As may be understood from the above, the pair of timing pulleys 57, 59 support the roll RM formed by winding of the photographic film and also rotatably drive this roll RM.

Further, as the roll RM is constantly pressed against the pair of timing pulleys 57, 59, even when the outer diameter of the roll RM varies in accordance with the total length of the stored film, the posture of the film at the film entrance/ exit of the film magazine, i.e. the angle at which the film enters from the film guide 73 as a film transit path and also the angle at which the film exits from the film guide do not vary.

Further, regardless of the outer diameter of the film roll RM which varies with the entire length of the stored film and even if the outer shape of the roll RM has low degree of roundness, as this roll RM bound between the core 71 and the timing belt 70 is constantly pressed concentrically from its outer periphery by means of the belt 70, the film may be retained in stable manner inside the magazine. In addition, as the film is not directly pressed by means of rollers or the like to keep its shape, there is less possibility of friction between the film magazine and the film when the latter is taken in and out of the former.

Further, as the film is stored by rotating the roll RM formed of the film by the force applied to the outer periphery of the roll RM, unlike a construction in which the film is taken up about a spool which is forcibly driven by rotate by an external force, there is no possibility of the film being twisted from the inside by the spool, resulting in peripheral friction-causing displacement between adjacent faces of the film.

As shown in FIG. 12, when the entire length of the film stored has increased, the outer diameter of the roll RM too is increased correspondingly. As a result, a greater portion of the timing belt 70 is entrained about the outer periphery of the roll RM. This additional length of timing belt 70 is provided as the bracket 62 and the tension pulleys 63a, 63b are moved away from the film guides 73 against the pulling force of the coil spring 69 of the urging mechanism.

Further, the bracket 62 includes a pair of arms 65a, 65b pivotally attached thereto. And, at the leading end of each of these arms 65a, 65b, there is rotatably mounted a dancer roller 64a, 64b. Each of these dancer rollers 64a, 64b projects from the bracket 62 toward the film guides 73. Then, in response to an urging force of coil springs 67a, 67b attached between the bracket 62 and the arms 65a, 65b which tend to contract, the dancer rollers 64a, 64b come into contact with the core 71 or the roll RM formed on the core 71, so as to constantly keep the core 71 or the roll RM pressed against the pair of timing pulleys 57, 59, irrespectively of the radius of the roll.

That is to say, the dancer rollers 64a, 64b can minimize wobbling or wavering of the roll RM which tends to occur due to the weight of the core 71 or the roll RM formed integral therewith at the moment of start or end of the rotating operation of the roll RM by the timing pulley 57 and timing belt 70. Further, these dancer rollers 64a, 64b, as aiding in the function of the timing belt 70 for maintaining the roll RM round in shape, may help reduce the required tension in the timing belt 70.

Further, as the tension pulleys 63a, 63b are disposed on the opposite side to the pair of timing pulleys 57, 59 across the roll RM, the dancer rollers 64a, 64b and the tension pulleys 63a, 63b may be disposed within the free space which extends and contracts on the opposite side to the pair of tiring pulleys 57, 59 across the roll RM in association with increase/decrease in the diameter of the roll RM.

Figure 13:
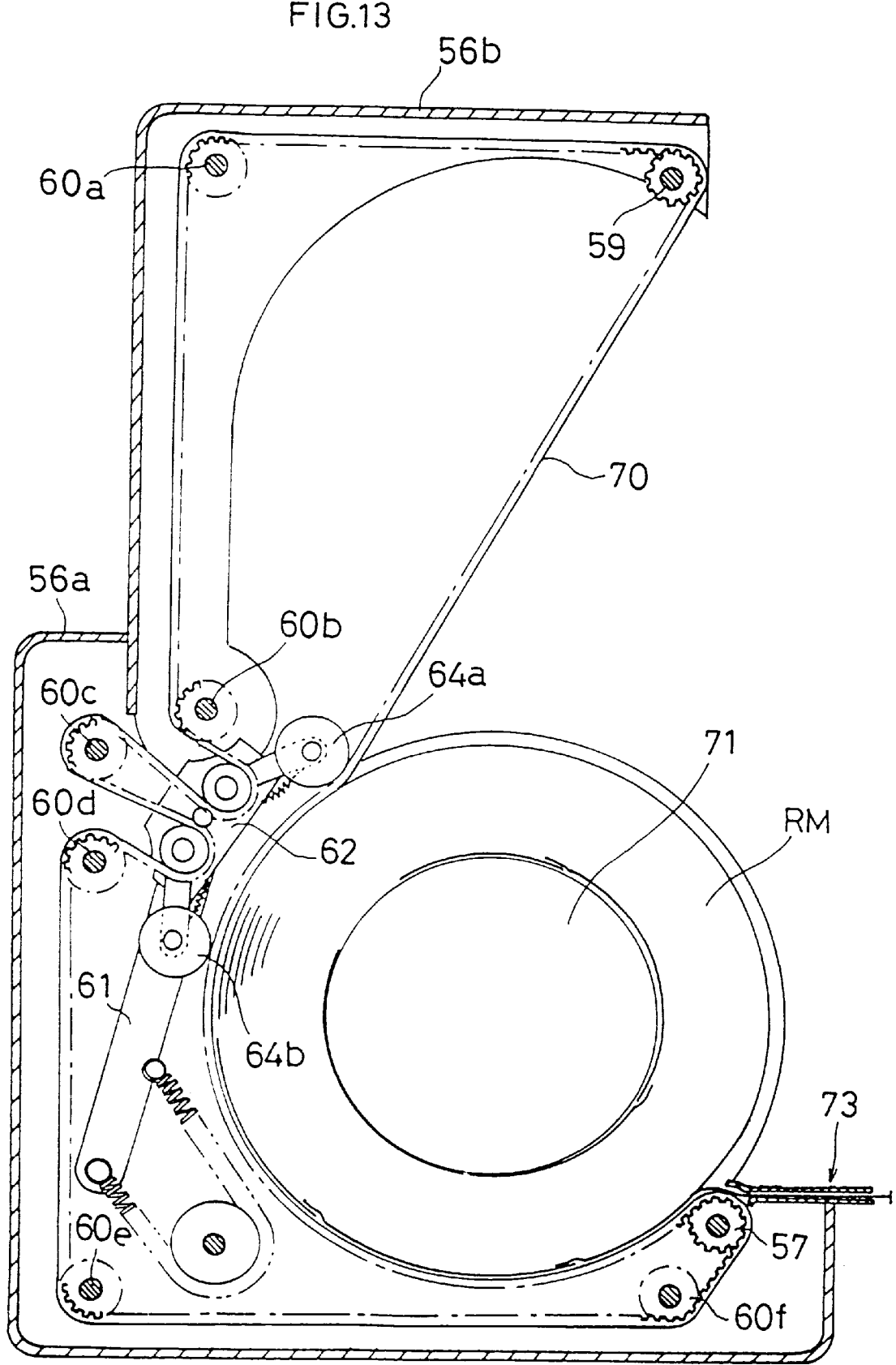
FIG. 13 is a front view showing the film magazine of FIG. 10 in a still different condition.

Also, as shown in FIG. 13, a case member portion 56b containing the axis of the timing pulley 59 is adapted to be pivotable upward together with the portion of the timing belt 70 entrained about this pulley 59 about the axis of the timing pulley 60b. Then, when necessary, by releasing the core 71 or the roll RM from the timing belt 70, it becomes possible to remove the core or roll out of the film magazine 55 or to re-attach it to the timing belt 70 to be inserted into the film magazine 55.

Sixth Embodiment

A sixth embodiment, which is a further modified construction of the fifth embodiment, will be described next.

Figure 14:
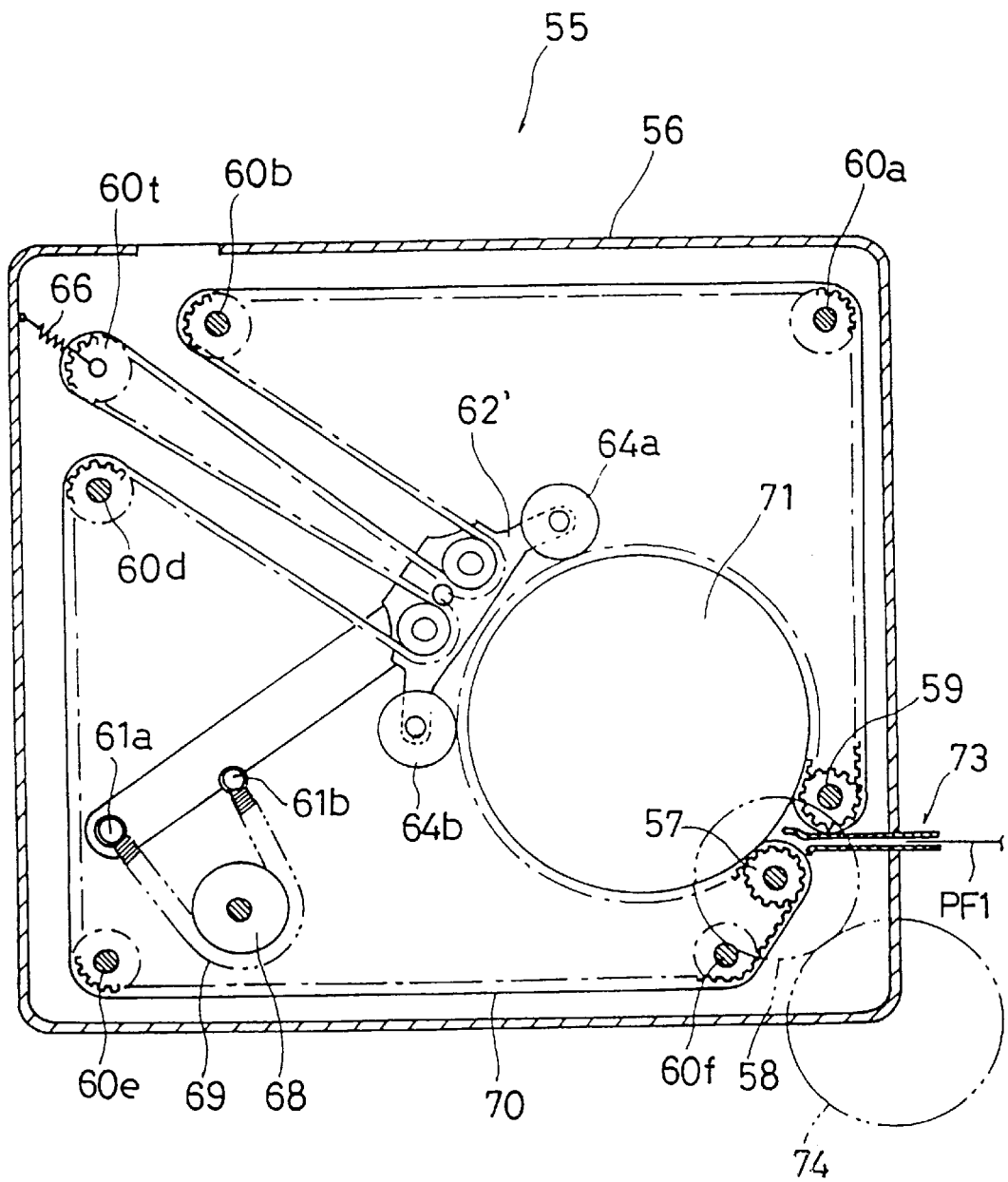
FIG. 14 is a front view showing a modified construction of the film magazine shown in FIG. 10.

First, as shown in FIG. 14, in this embodiment, the dancer rollers 64a, 64b are supported to have the axes thereof fixed in position relative to a bracket 62', whilst the timing pulley 60c having its axis fixed in position in the fifth embodiment is replaced by another tension pulley 60t. With this modified construction too, like the foregoing embodiments described above, the constant contact between the dancer rollers and the roll may be achieved, regardless of variation in the positions of the tension pulley and its support member in response to increase/decrease in the radius of the roll.

Seventh Embodiment

Figure 15:
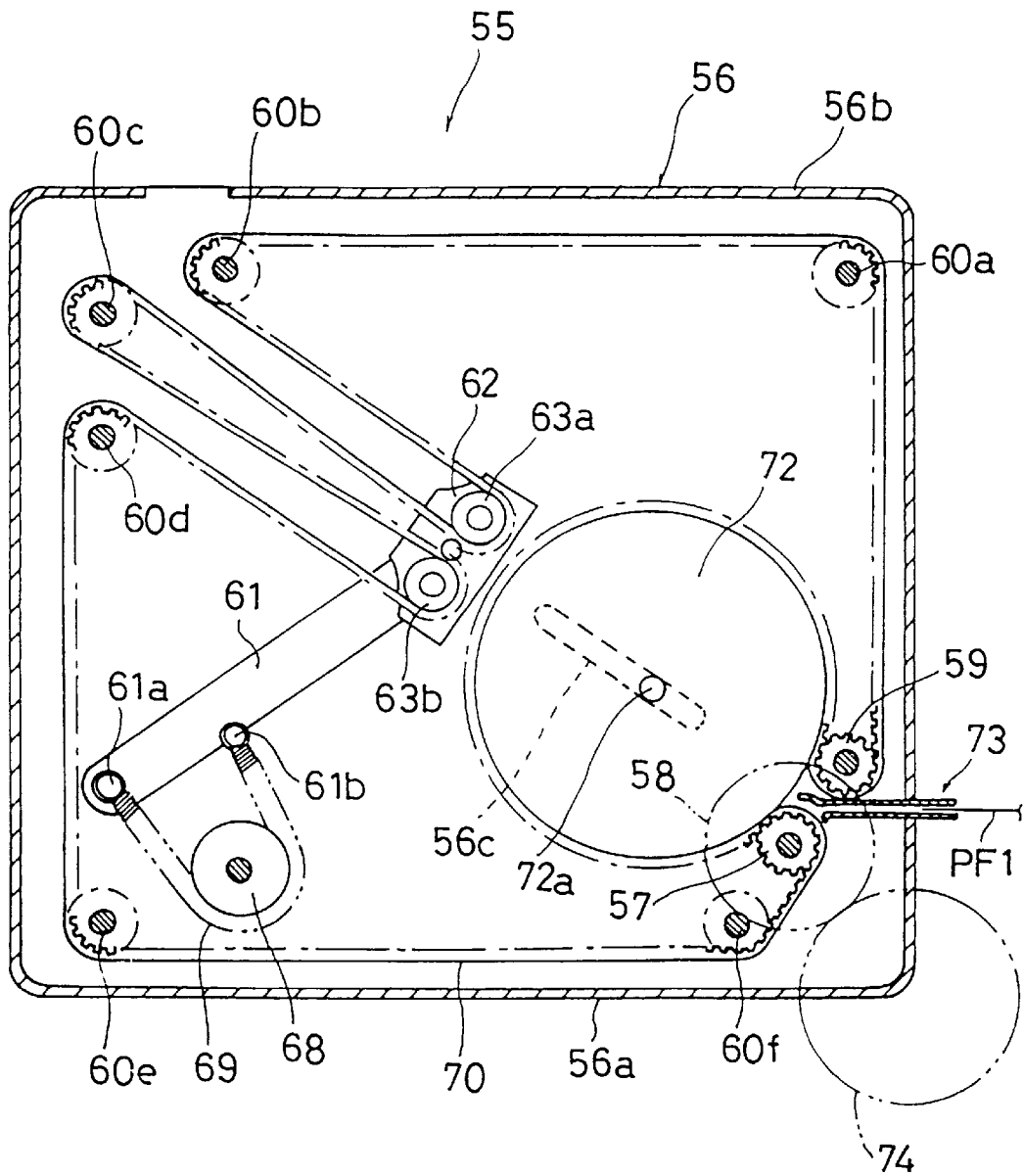
FIG. 15 is a front view showing a still modified construction of the film magazine shown in FIG. 10.

FIG. 15 shows a seventh embodiment of the invention in which instead of using the dancer rollers, the core 72 for forming the roll RM about the outer periphery thereof includes a shaft 72a attached thereto for rotatably supporting the core 72. And, an elongate slot 56c for regulating direction of movement of the shaft 72a is defined in e.g. the case member 56a. In this manner too, the wobbling of the roll at the start or end of its rotational operation may be effectively restricted. That is, the wobbling movement has a vector component extending parallel with a linear segment extending between the axes of the timing pulleys 57, 59, this wobbling movement may be restricted by means of the elongate slot 56c which extends substantially perpendicular to the linear segment.

Incidentally, with the constructions of the fourth through seventh embodiments described hereinbefore and of an eighth embodiment to be described later, a plurality of separate, i.e. non-spliced films or film pieces can also be taken in and out of the magazine one after another by superposing the ends of the films or pieces (e.g. one frame portions of them may be superposed one on the other). In this, as shown in FIG. 12, the successive storing operation may be effected in such a manner that the rear end of preceding film (PF1) is superposed on the leading end of the subsequent film (PF2). With this storing method, if the film storing operation is to be continuously effected, when these superposed ends of these films are caused to circulate, together with the core 71, once inside the case member 56 and then pass again between the pair of timing pulleys 57, 59, the leading end of the subsequent film (PF1) will not be raised radially outward to project from between the pulleys 57, 59 and will appropriately enter the gap between the timing pulley 57 and the roll RM. Similarly, in withdrawing stored films, the leading end of the subsequent film (PF1) will not be separated from the rear end of the preceding film (PF2) to accidentally enter the gap between the timing pulley 57 and the roll RM. Instead, as the leading end of the subsequent film is kept pressed by the rear end of the preceding film, the former may be properly guided in to the guides 73; hence, these films may be properly taken out in succession.

In the foregoing embodiments, the magazines are adapted for storing a plurality of negative pieces separate from each other. Needless to say, however, these magazines can also store an elongate spliced film assembly also.

Also, the belt member for holding the roll formed by winding of a film need not be a timing belt. Instead, this may be any strip-like member having flexibility. For instance, an ordinary belt having both faces thereof formed flat or an O-ring may be employed instead.

Eighth Embodiment

FIGS. 16 through 22 show an eighth embodiment of the invention which is a modified construction of the seventh embodiment described above. This embodiment employs two independent tension roller systems.

Figure 18:
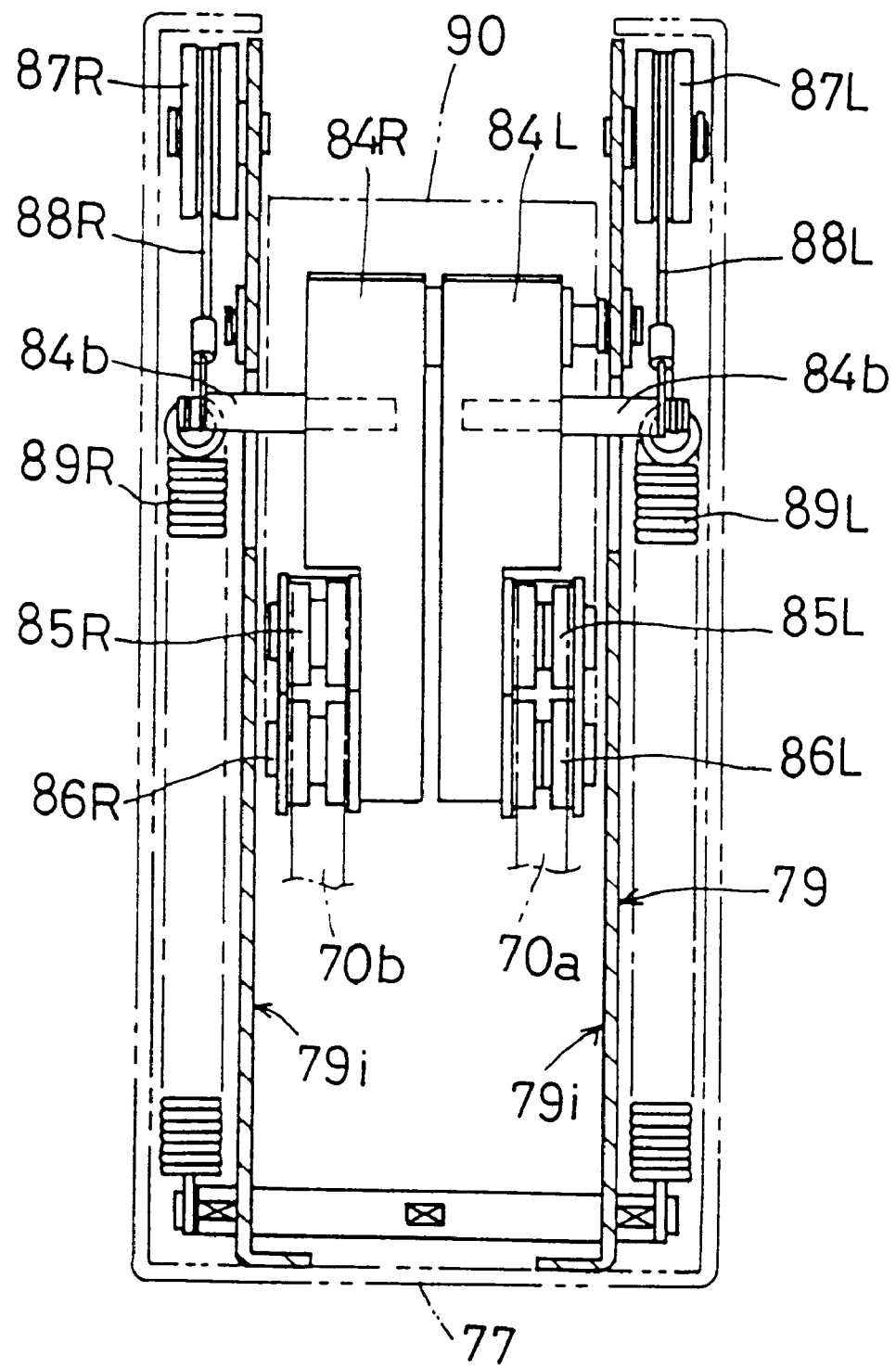
FIG. 18 is a side view showing the film magazine of FIG. 16.
Figure 19:
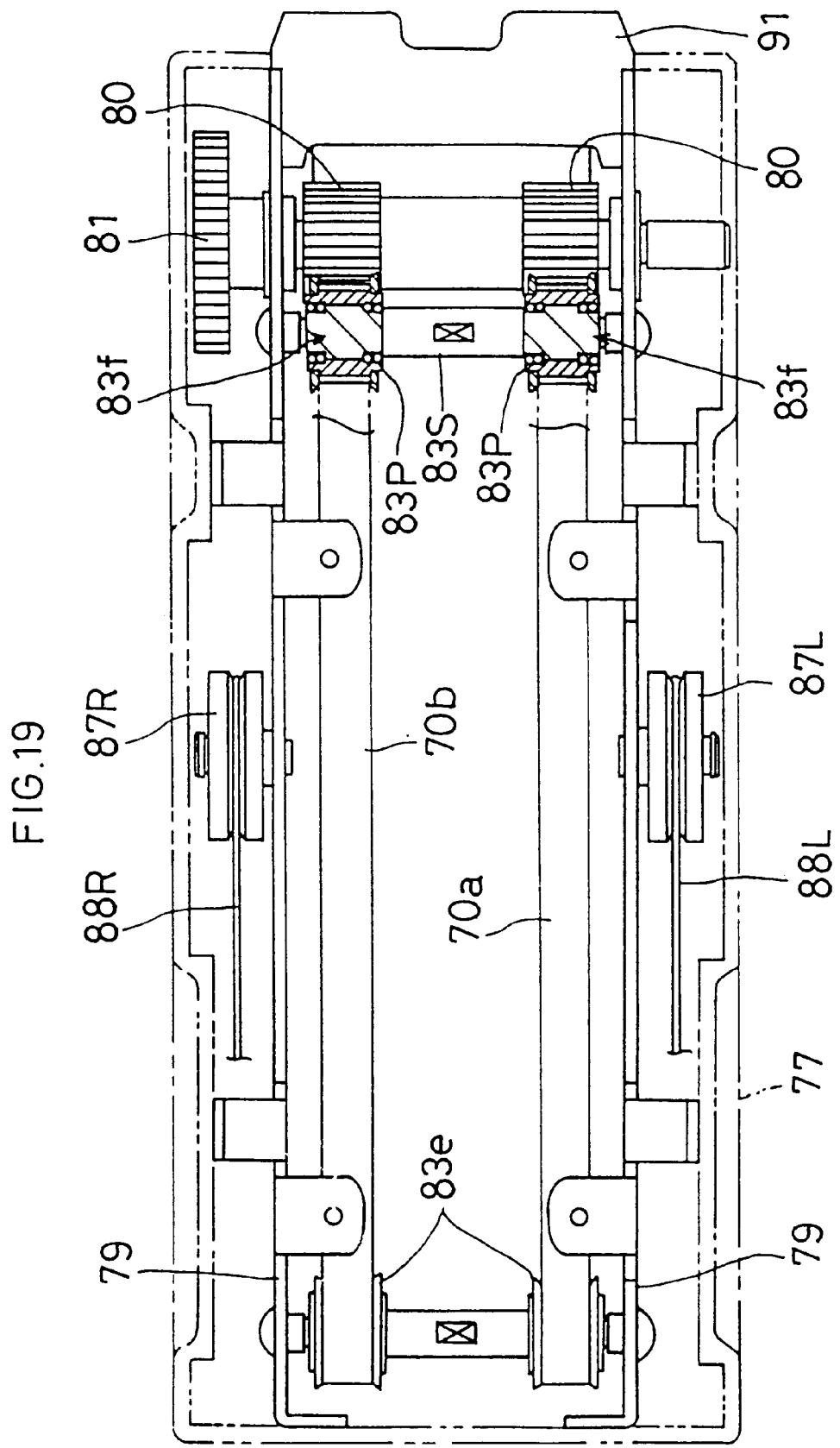
FIG. 19 is a plan view showing the film magazine of FIG. 16.

Namely, a film magazine 78 according to this embodiment, as shown in FIGS. 18 and 19, includes a case member 79 having inner side faces 79i, 79i finished with high degree of surface smoothness. The inner side faces 79i, 79i are spaced apart from each other with a distance slightly greater than a 35 mm film PF1. The inner side faces 79i, 79i rotatably support therebetween one timing pulley 80 as a drive pulley rotatably driven by an external rotational drive force and a plurality of further timing pulleys 82, 83a, 83b, 83c, 83d, 83e, 83f having respective rotational axes thereof fixed in horizontal orientation.

Further, between the opposed inner side faces 79i, 79i, there is disposed a cylindrical core 90 made of synthetic resin to be rotatable and have its axis movable. And, this core 90 can be removed out of the case member 79. The width of the core 90 is sized in such manner that it is freely movable and rotatable without excessive "looseness" with the space between the inner side faces 79i, 79i.

In the case member 79, there are provided a parallel pair of toothed endless timing belts 70 each having one portion thereof entrained about the core 90 and having the other portion thereof extending through between the timing pulleys 80, 82 and then entrained about the timing pulleys 83a, 83b, 83c, 83d, 83e, 83f whose axes are fixed in position. In the case member 79, there are further provided tension pulleys 85, 86 for applying tension greater than a predetermined value to the timing belt 70. The core 90 is constantly urged towards the timing pulleys 80, 82 by means of the belt 70. In other words, the timing pulleys 80 and 82 together constitute a pair of rotary members for supporting, via the belt 70, the core 90 or a roll of film to be formed on this core 90 in a manner described later. As a result, the core 90 or the film roll may constantly maintained in a stable manner inside the case member 79, regardless of the amount of film taken up about the core 90.

Incidentally, as shown in FIGS. 18 and 19, the timing belt 70 consists of a pair of parallel belt members 70a, 70b adapted to come into contact only the rows of perforations of a photographic film.

Figure 16:
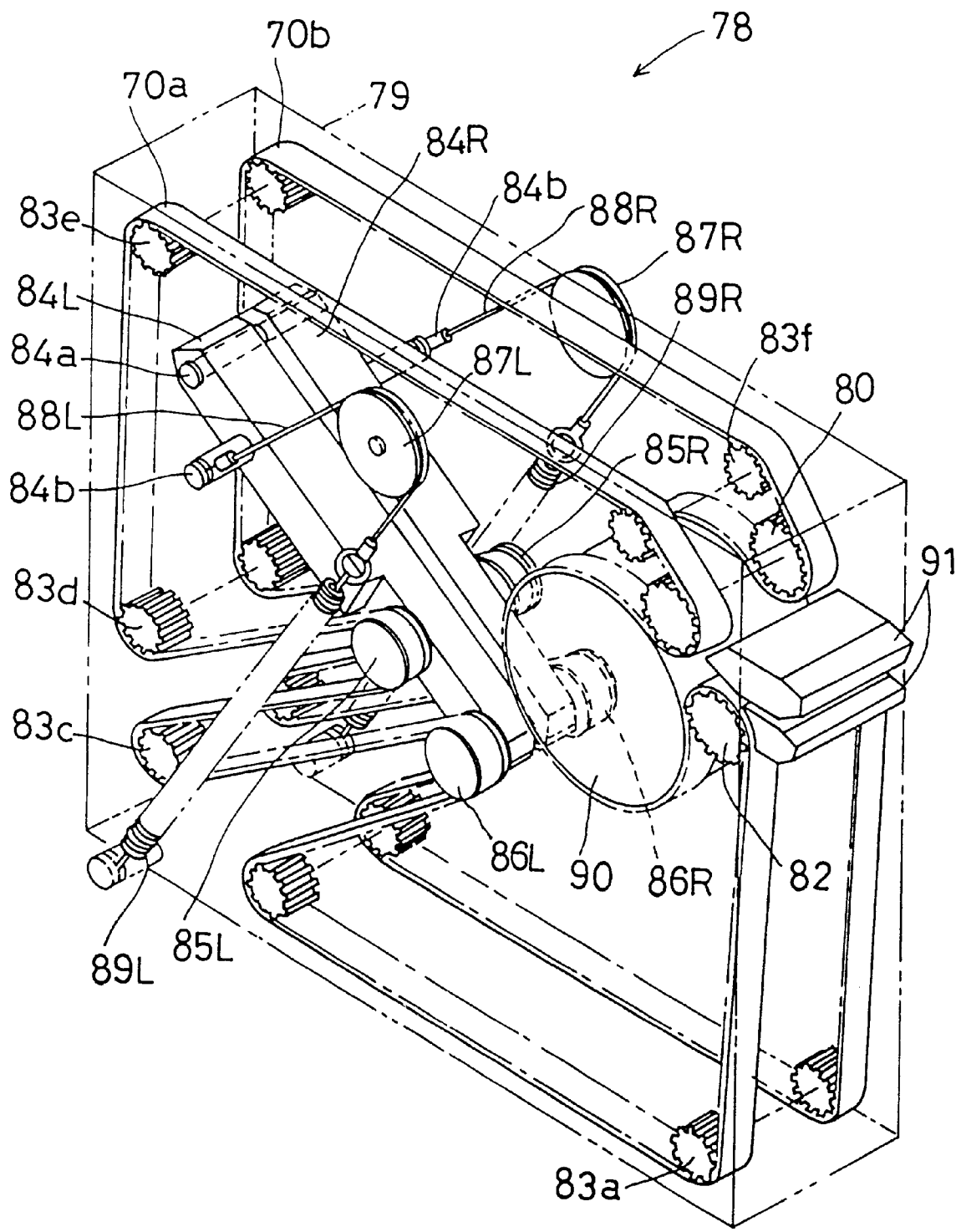
FIG. 16 is a perspective view showing a film magazine according to a eighth embodiment of the invention.

In the instant embodiment, as best shown in FIG. 16, tension pulleys 85, 86 are provided independently to the two timing belts 70a, 70b. Namely, there are provided timing pulleys 85L, 86L for applying the tension to the one belt 70a shown in the left-handed side in FIG. 18 and timing pulleys 85R, 86R for applying the tension to the other belt 70b shown on the right-handed side in FIG. 18. Further, a tension arm 84 acting as a support member for position-adjustably supporting the tension pulleys 85, 86, too is provided independently to each of the two timing belts 70a, 70b. Specifically, there are provided a pair of left and right tension arms 84L, 84R pivotable independently of each other relative to the case member 79, with the left tension pulleys 85L, 86L being rotatably supported to the tension arm 84L and the right tension pulleys 85R, 86R being rotatably supported to the tension arm 84R, respectively. These tension arms 84L, 84R are made of rigid material such as stainless steel.

Each of the tension arms 84L, 84R is attached to the case member 79 to be pivotable about an axis 84a and is urged by an urging mechanism so that the free end of the tension arm 84L, 84R tends to move toward the timing pulleys 80, 82. The urging mechanism consists essentially of a pulley 87L, 87R rotatably disposed outside the case member 79 and having its axis fixed in position, a wire rope 88L, 88R having one end thereof fixed to a pin 84b attached to an intermediate portion of the tension arm 84L, 84R, and a coil spring 89L, 89R having one thereof fixed to the case member 79 so as to pull the other end of the wire rope 88 away from the timing pulleys 80, 82.

As described above, the tension pulleys for maintaining the tension over a predetermined value applied to the timing belt 70, 70, the tension arm for supporting the tension pulleys and the urging mechanism for urging the orientation of the tension arm so as to maintain the tension on the belt 70, 70 irrespectively of the outer diameter of the roll are provided independently for each of the two timing belts 70, 70. Accordingly, even if there is developed a difference between the lengths of the two timing belts 70, 70 when one of the belts becomes elongated due to some reason, the timing belts 70, 70 may always be maintained under the tension over the predetermined value, whereby such an erroneous operation as slippage of the elongated belt 70 on the timing pulley 80 as the drive pulley may be avoided.

Figure 17:
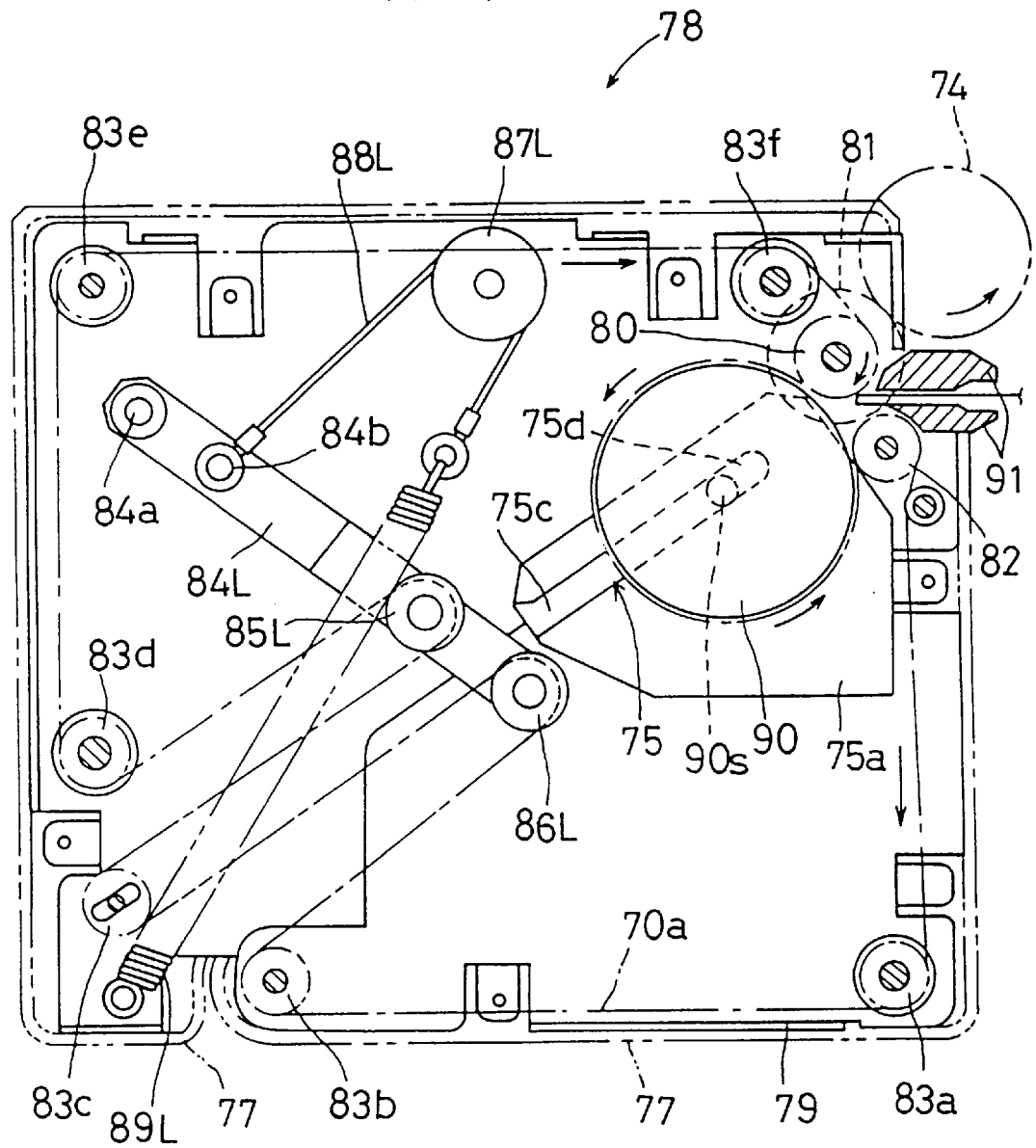
FIG. 17 is a front view showing the film magazine of FIG. 16.

As shown in FIG. 17, the timing pulley 80 as the drive pulley is adapted to be rotatable in unison with the gear 81 disposed coaxially therewith, and this pulley 80 can be driven to rotate in a controlled manner by a drive gear 74 which is provided to the film take-up mechanism or printer processor in turn is rotatably driven by means of an unillustrated step motor or the like. As the tiring pulley 80 is driven to rotate by the external force, the timing belt 70 and the core 90 contacting the portion of the belt 70 too are driven to rotate.

Between the pair of timing pulleys 80, 82, the pair of film guides 91 having smooth surfaces are disposed horizontally as a film entrance/exit.

Then, when e.g. a negative piece PF1 is inserted from the film guides 91 toward the timing pulley 80 while rotating the timing pulley 80 and the timing belt 70 in the direction denoted with an arrow, the leading end of the negative piece PF1 is pinched between the timing belt 70 and the core 90 and is pulled along a tangential direction to the timing pulley 82 and to the core 90. Then, the entire negative piece PF1 will be wound about the outer periphery of the core 90. That is, the negative piece PF1 will be gradually stored between the outer peripheral face of the core 90 and the timing belt 70 entrained about the core 90.

Figure 20:
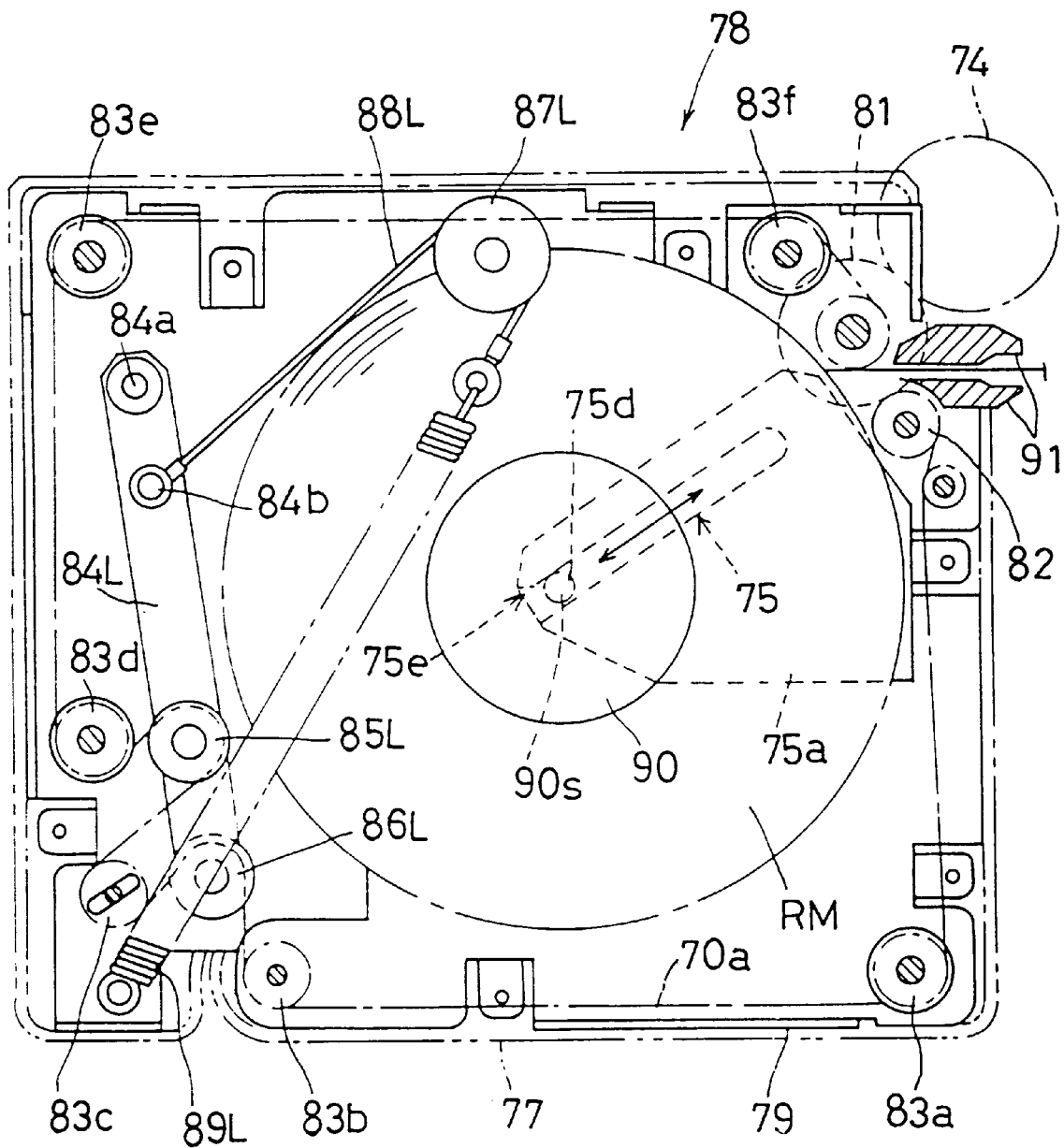
FIG. 20 is a front view showing the film magazine of FIG. 16 in a different condition.

Further, as a number of negative pieces PF2, . . . PFn are inserted one after another following the first negative piece PF1, these pieces too can be stored in the same manner as above between the core 90 and the timing belt 70. With the above-described operation, as illustrated in FIG. 20, a roll RAM of the negative pieces RF will be formed on the outer periphery of the core 90 (because, the roll RM bound between the core 90 and the belt 70 too are rotated via the timing belt 70 with the rotation of the timing pulley 80). Within this film roll RM, the original inserting order starting with the first-inserted negative piece PF1 (located at the innermost position of the roll RM) until the last-inserted negative piece Pn (located at the outermost position of the roll RM and contacting the timing belt 70) is completely maintained.

As may be understood from the above, the pair of timing pulleys 80, 82 support the roll RM formed by winding of the photographic film and also rotatably drive this roll RM.

Further, as the roll RM is constantly pressed against the pair of timing pulleys 80, 82, the posture of the film at the film entrance/exit of the film magazine, i.e. the angle at which the film enters from the film guide 91 as a film transit path and also the angle at which the film exits from the film guide 91 do not vary, so that the film may always be inserted and withdrawn smoothly.

Further, regardless of the outer diameter of the film roll RM which varies with the entire length of the stored film and even if the outer shape of the roll RM has low degree of roundness, as this roll RM bound between the core 90 and the timing belt 70 is constantly pressed concentrically from its outer periphery by means of the belt 70, the film may be retained in stable manner inside the magazine. In addition, as the film is not directly pressed by means of rollers or the like to keep its shape, there is less possibility of friction between the film magazine and the film when the latter is taken in and out of the former.

Further, as the film is stored by rotating the roll RM formed of the film by the force applied to the outer periphery of the roll RM, unlike a construction in which the film is taken up about a spool which is forcibly driven by rotate by an external force, there is no possibility of the film being twisted from the inside by the spool, resulting in peripheral friction-causing displacement between adjacent faces of the film.

In addition, as the roll RM is rotatably driven via the rotational drive of the timing belts 70, unlike the construction in which the film is taken up about a spool which is forcibly driven by rotate by an external force, as long as the drive speed of the timing belts 70 is maintained constant, the speed of the film introduced into the film magazine in the vicinity of the film guide 91 and also the speed of the film taken out of the magazine in vicinity of the same may be maintained constant, regardless of the variation in the outer diameter of the formed roll RM.

In this eighth embodiment, the dancer rollers 64a, 64b described hereinbefore in the fifth embodiment and shown in FIG. 10 are eliminated. In this embodiment, the wobbling or wavering phenomenon of the roll RM which tends to occur due to the weight of the roll per se when e.g. the rotational drive thereof is started or stopped is restricted by a roll guide mechanism described hereunder.

Namely, this roll guide mechanism consists essentially of a metal shaft member 90s fixed to the center of the core 90 and a pair of guide slots 75, 75 defined in the inner sides of the case member 79. The shaft member 90s has a length slightly greater than the width of the core 90 so as to project by a few millimeters from the opposed sides of the core 90 respectively. The pair of guide slots 75, 75 accommodate these projecting portions of the shaft member 90s thereby to restrict the direction of movement of the core 90 along a straight direction denoted with an arrow in FIG. 20.

As shown in FIG. 21(a), the case member 79 consists of two separate parts, i.e. an upper case 79a which supports the timing pulley 80 and a lower case 79b which supporting the timing pulley 82. And, as shown in FIG. 21(b), the upper case 79a is pivotable relative the lower case 79b about an axis X2 provided to the lower case 79b.

Figure 22:
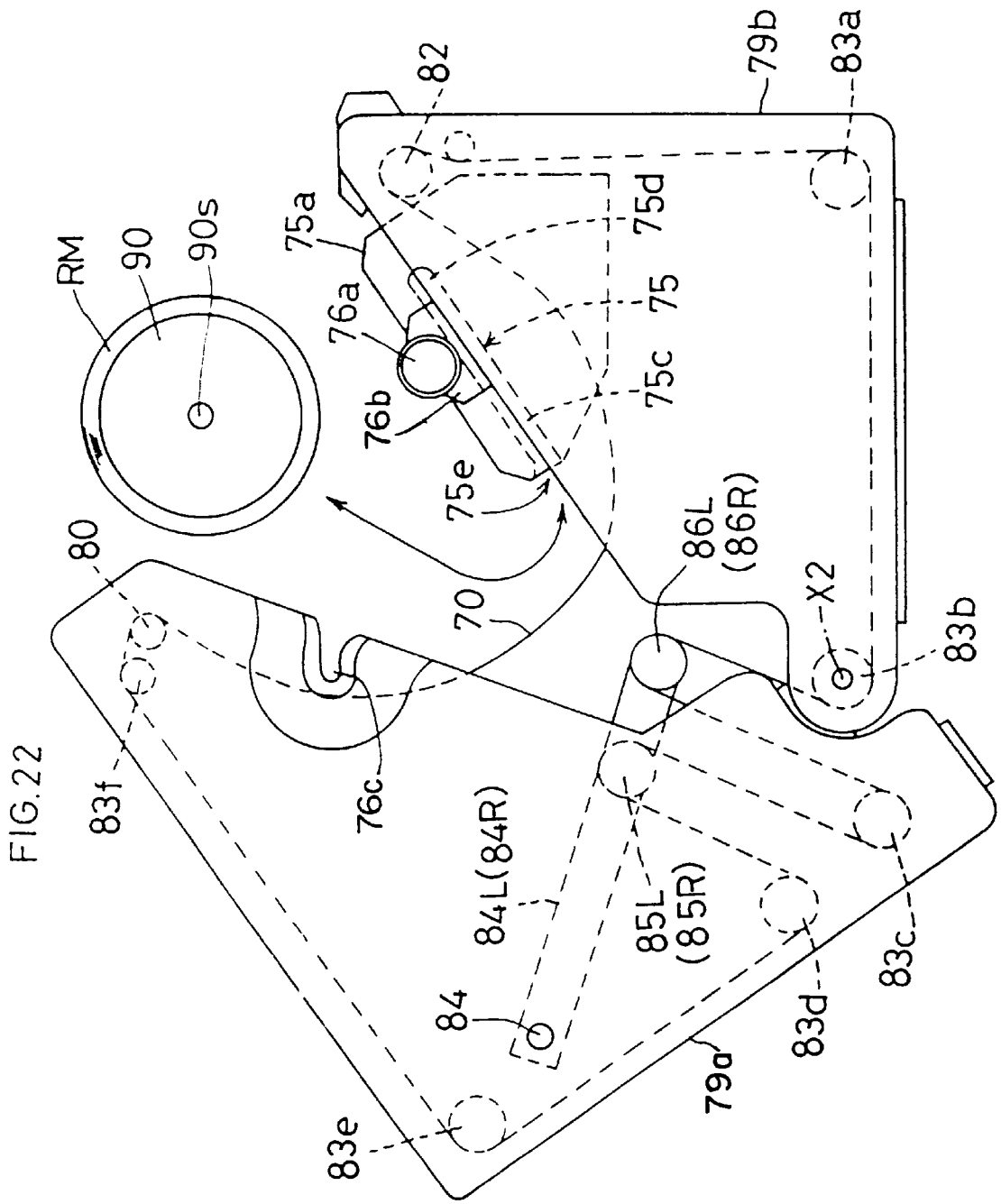
FIG. 22 is a front view illustrating a mounting/dismounting operation of a core to and from the film magazine of FIG. 16.

The lower case 79b includes guide-slot forming members 75a, 75a made of synthetic resin which define the above-described pair of guide slots 75, 75 in mutually opposing faces thereof. Each of the guide slots 75, 75 extends linearly from a first end 75c located farthest from the film guide 91 to a second end 75d located nearest the film guide 91, so that the slot extends substantially normal to a line segment extending between the respective axes of the guide pulley 80 and the timing pulley 82. The first end 75c is adapted to act an inlet for introducing the shaft member 90s of the core 90 into the guide slots 75, 75. To this end, this first end 75c includes a guide face 75e for facilitating entrance/exit of the shaft member 90s of the core 90. Then, as the upper case 79a is pivotally opened relative to the lower case 79b as illustrated in FIG. 21(b) or 22 and then the shaft member 90s of the core 90 is inserted into the guide slots 75, 75, the core 90 is urged toward the second ends 75d of the guide slots 75, 75 by means of the urging mechanism including the tension arms 84L, 84R and others and also the tension on the timing belts 70. In this operation, as the second ends 75d of the guide slots 75, 75 are closed, the above-described urging force serves to prevent the core 90 from springing out of the film magazine 78 by the above-described urging mechanism when this upper case 79a is pivotally opened relative to the lower case 79b.

Incidentally, the length of the guide slot 75, 75, that is, the location of the second end 75d and of the first end 75c, is predetermined in such a manner that this closed second end 75d will not hinder the core 90 having no film taken up thereon as shown in FIG. 21(a) from approaching sufficiently both the timing pulley 80 and the timing pulley 82 in order to form a tangential line to these pulleys and also that even the core 90 having taken up the films to the maximal degree as shown in FIG. 20 will not cause the guide groove 75, 75 to deviate from the first end 75c.

For mounting the core 90 inside the film magazine 78, first, the upper case 79a is pivotally opened relative to the lower case 79b, the core 90 is fitted into the guide slots 75, 75 with the pair of timing belts 70, 70 being wound about an outer peripheral portion of the core 90; and then the upper case 79a is pivotally closed relative to the lower case 79b. With this closing operation, the guide-slot forming members 75a, 75a are inserted into the upper case 79a.

Incidentally, from a position of the lower case 79b corresponding outwardly to the guide-slot forming member 75a, 75a, there is provided a knob support plate 76b which rotatably supports a knob 76a. In operation, after the upper case 79a is closed relative to the lower case 79b, the knobs 76a on the opposed sides of the lower case 79b will be manually rotated clockwise, whereby an engaging recess 76c formed in the upper case 79a becomes tightened between the neck of the knob 76a and the knob support plate 76b, so that the upper case 79a and the lower case 79b are locked to each other in this closed state. This locking mechanism consisting of the knob 76a and the engaging recess 76c is provided to each of the opposed sides of the film magazine 78.

The timing pulleys 82, 83a, 83b, 83c, 83d, 83e, 83f, 85 and 86, as their name indicates, have teeth for meshing with the rack teeth formed on the inner side of the timing belts 70. In the case of all the timing pulleys other than the timing pulley 80 as the drive pulley, each right and left pair of the pulleys are mounted via ball bearings 83P on a shaft 83S to be rotatable relative to each other, as represented by the timing pulleys 83f shown in FIG. 19. Accordingly, if there occurs jumping between a tooth on the inner side of the belt 70 and a tooth of these timing pulleys when the core 90 is mounted or dismounted to and from the film magazine 78, local extension or contraction of the belt 70 at an intermediate portion thereof will not remain.

Incidentally, for the sake of clarity of description, in FIG. 16, the case member is denoted with an alternate long and two short dashes line and the respective components attached thereto are denoted with solid lines. In FIGS. 17 through 20, all these members and components are denoted generally with solid lines, whist the cover member 77 forming these members and components and formed of a transparent resin such as polycarbonate is denoted with an alternate long and two short dashes line. Further, in FIGS. 21 and 22, the outer contour formed by the cover member 77 is denoted with a solid line.

Although the present invention has been described with reference some particular embodiments, it is to be understood that these embodiments are merely illustrative of the application of the principles of the invention. Numerous modifications may be made therein and other arrangements may be devised without departing from the spirit and scope of the invention.

What is claimed is:

1. A film magazine for taking up a film in the form of a roll, with the film being releasable therefrom, the magazine supporting the film with allowing a rotational axis of the formed film roll to be adjustable in position in accordance with variation in the outer diameter of the film roll resulting from the take-up or unwinding operation of the film, the magazine comprising:

an endless belt for supporting the film roll from the outer peripheral face thereof;

means for rotatably driving the roll via a rotational drive of the endless belt;

a pair of rotary rollers having an axis thereof fixed in position for supporting the roll via the endless belt;

a film entrance/exit disposed between the pair of rotary rollers for guiding the film on to the roll from the outside or guiding the film from the roll to the outside;

a tension pulley for maintaining a predetermined tension in the endless belt irrespectively of the variation in the outer diameter of the roll;

a core for supporting the roll from an inner peripheral face thereof, the core having projections projecting from opposed sides thereof; and means for limiting, within a predetermined line segment, the movement of the axis of the core associated with the variation in the outer diameter of the roll, said limiting means having guide slots capable of respectively receiving said projections therein and extending along said predetermined line segment.

2. The film magazine according to claim 1, further comprising a case for accommodating the film roll therein, said case including a first case member and a second case member which are pivotable relative to each other about an axis between a closed state in which the roll or core is rotatably driven via the belt and an opened state in which the film or core can be taken out the film magazine;

wherein said guide slots are formed in either said first case member or said second case member; and a stopper is provided at one end of each said guide slot adjacent the roller, so that the core is pressed against the stopper by means of the belt in association with a pivotal operation of said case member to the opened state.

3. A film magazine for taking up a film in the form of a roll, with the film being releasable therefrom the magazine supporting the film with allowing a rotational axis of the formed film roll to be adjustable in position in accordance with variation in the outer diameter of the film roll resulting from the take-up or unwinding operation of the film, the magazine comprising:

an endless belt for supporting the film roll from the outer peripheral face thereof;

means for rotatably driving the roll via a rotational drive of the endless belt;

a pair of rotary rollers having an axis thereof fixed in position for supporting the roll via the endless belt;

a film entrance/exit disposed between the pair of rotary rollers for guiding the film on to the roll from the outside or guiding the film from the roll to the outside;

a tension pulley for maintaining a predetermined tension in the endless belt irrespectively of the variation in the outer diameter of the roll;

wherein said endless belt comprises a pair of belts respectively coming into engagement only with opposed rows of perforations formed in the film.

4. The film magazine according to claim 3, wherein said driving means includes a drive roller having engaging teeth in the outer periphery thereof, while said endless belt is provided as a toothed timing belt engageable with the engaging teeth of the drive roller;

a pair of auxiliary timing pulleys for maintaining tension in the timing belt are provided for each of the two timing belts, with the pair of auxiliary timing pulleys being adapted to be rotatable relative to each other.

5. A film magazine for taking up a film in the form of a roll, with the film being releasable therefrom the magazine supporting the film with allowing a rotational axis of the formed film roll to be adjustable in position in accordance with variation in the outer diameter of the film roll resulting from the take-up or unwinding operation of the film, the magazine comprising:

an endless belt for supporting the film roll from the outer peripheral face thereof;

means for rotatably driving the roll via a rotational drive of the endless belt;

a pair of rotary rollers having an axis thereof fixed in position for supporting the roll via the endless belt;

a film entrance/exit disposed between the pair of rotary rollers for guiding the film on to the roll from the outside or guiding the film from the roll to the outside;

a tension pulley for maintaining a predetermined tension in the endless belt irrespectively of the variation in the outer diameter of the roll;

wherein said endless belt comprises a pair of belts respectively coming into engagement with opposed rows of perforations formed in the film; and said tension pulley and a support member for supporting said tension pulley in such a manner as to allow displacement thereof are provided independently to each of said pair of belts.

6. The film magazine according to claim 5, wherein said driving means includes a drive roller having engaging teeth in the outer periphery thereof, while said endless belt is provided as a toothed timing belt engageable with the engaging teeth of the drive roller;

a pair of auxiliary timing pulleys for maintaining tension in the timing belt are provided for each of the two timing belts, with the pair of auxiliary timing pulleys being adapted to be rotatable relative to each other.

* * * * *